US012269277B2

(12) United States Patent
Yamada et al.

(10) Patent No.: US 12,269,277 B2
(45) Date of Patent: Apr. 8, 2025

(54) RECORDING APPARATUS

(71) Applicant: SEIKO EPSON CORPORATION, Tokyo (JP)

(72) Inventors: Rikuo Yamada, Yamagata-Mura (JP); Hideaki Nishijima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 193 days.

(21) Appl. No.: 18/193,756

(22) Filed: Mar. 31, 2023

(65) Prior Publication Data

US 2023/0311546 A1 Oct. 5, 2023

(30) Foreign Application Priority Data

Apr. 1, 2022 (JP) ................................ 2022-061823

(51) Int. Cl.
*B41J 29/02* (2006.01)
*B41J 25/00* (2006.01)

(52) U.S. Cl.
CPC .................................. *B41J 25/003* (2013.01)

(58) Field of Classification Search
CPC ............. B41J 29/02; B41J 29/54; B41J 29/58
See application file for complete search history.

(56) References Cited

U.S. PATENT DOCUMENTS 5,517,226 A 5/1996 Uehara et al.
6,012,810 A 1/2000 Ohashi
6,499,310 B2 12/2002 Reinisch et al.
2002/0007642 A1 1/2002 Reinisch et al.
2016/0236493 A1 * 8/2016 Lyman ................ H01R 33/765
2018/0250943 A1 9/2018 Fukasawa et al.
2021/0206168 A1 7/2021 Raymond et al.

FOREIGN PATENT DOCUMENTS

EP 1110742 11/2001
GB 2343658 A * 5/2000 ............. B41J 29/02
JP H10-305572 A 11/1998
JP 2002-211077 7/2002
JP 2018-144239 A 9/2018

* cited by examiner

*Primary Examiner* — Scott A Richmond
(74) *Attorney, Agent, or Firm* — WORKMAN NYDEGGER

(57) ABSTRACT

A switching portion is configured to change in position between a first switching position and a second switching position, at which the switching portion protrudes more from a bottom surface of a housing than at the first switching position. The first switching position is a position at which the switching portion is located in a state of being in contact with the installation surface when the housing is installed on the installation surface. The second switching position is a position at which the switching portion is located when the housing is not installed on the installation surface. The switching portion does not restrict a change in position of a body in a position-change direction when located at the first switching position and restricts the change in position of the body in the position-change direction when located at the second switching position.

8 Claims, 19 Drawing Sheets

RECORDING APPARATUS

The present application is based on, and claims priority from JP Application Serial Number 2022-061823, filed Apr. 1, 2022, the disclosure of which is hereby incorporated by reference herein in its entirety.

BACKGROUND

1. Technical Field

Embodiments of the present disclosure relate to a recording apparatus that performs recording on a medium.

2. Related Art

As a recording apparatus that performs recording on a medium, for example, in JP-A-10-305572, an apparatus that includes a body in which a recording unit is mounted and a housing configured to house the body is disclosed. Such a recording apparatus has a structure that makes it possible to change the position of the body between a closed position at which the body is housed inside the housing and an open position at which the body is located outside the housing.

However, in such a recording apparatus, there is a risk that the user might unintentionally change the position of the body with respect to the housing if the housing is tilted due to the lifting up of the housing from the installation surface.

SUMMARY

A recording apparatus according to a certain aspect of the present disclosure includes: a recording unit that performs recording on a medium; a body configured to be changed in position in a position-change direction intersecting with a vertical direction, the recording unit being mounted in the body; a switching portion configured to switch whether to restrict a change in position of the body in the position-change direction or not; and a housing configured to house the body, wherein the switching portion is configured to change in position between a first switching position and a second switching position at which the switching portion protrudes more from a bottom surface of the housing than at the first switching position, the first switching position is a position at which the switching portion is located in a state of being in contact with an installation surface when the housing is installed on the installation surface, the second switching position is a position at which the switching portion is located when the housing is not installed on the installation surface, and the switching portion does not restrict the change in position of the body in the position-change direction when located at the first switching position and restricts the change in position of the body in the position-change direction when located at the second switching position.

DESCRIPTION OF EXEMPLARY EMBODIMENTS

First Embodiment

A recording system according to an exemplary embodiment that includes a recording apparatus will now be explained. In the description below, a direction intersecting with (for example, orthogonal to) a vertical direction Z will be referred to as "width direction X", and a direction intersecting with the vertical direction Z and the width direction X will be referred to as "front-rear direction Y". One of the two orientations of the width direction X will be referred to as "first width direction X1", and the other thereof will be referred to as "second width direction X2". One of the two orientations of the front-rear direction Y is defined as "front direction Y1" (the direction toward the front, forward, ahead of, in front of, etc.) and the other thereof is defined as "rear direction Y2" (the direction toward the rear, rearward, behind, etc.). One of the two orientations of the vertical direction Z is defined as "top direction Z1" (the direction toward the top, vertically upward, over, above, etc.) and the other thereof is defined as "bottom direction Z2" (the direction toward the bottom, vertically downward, under, below, etc.).

Structure of Recording System 10

Figure 1:
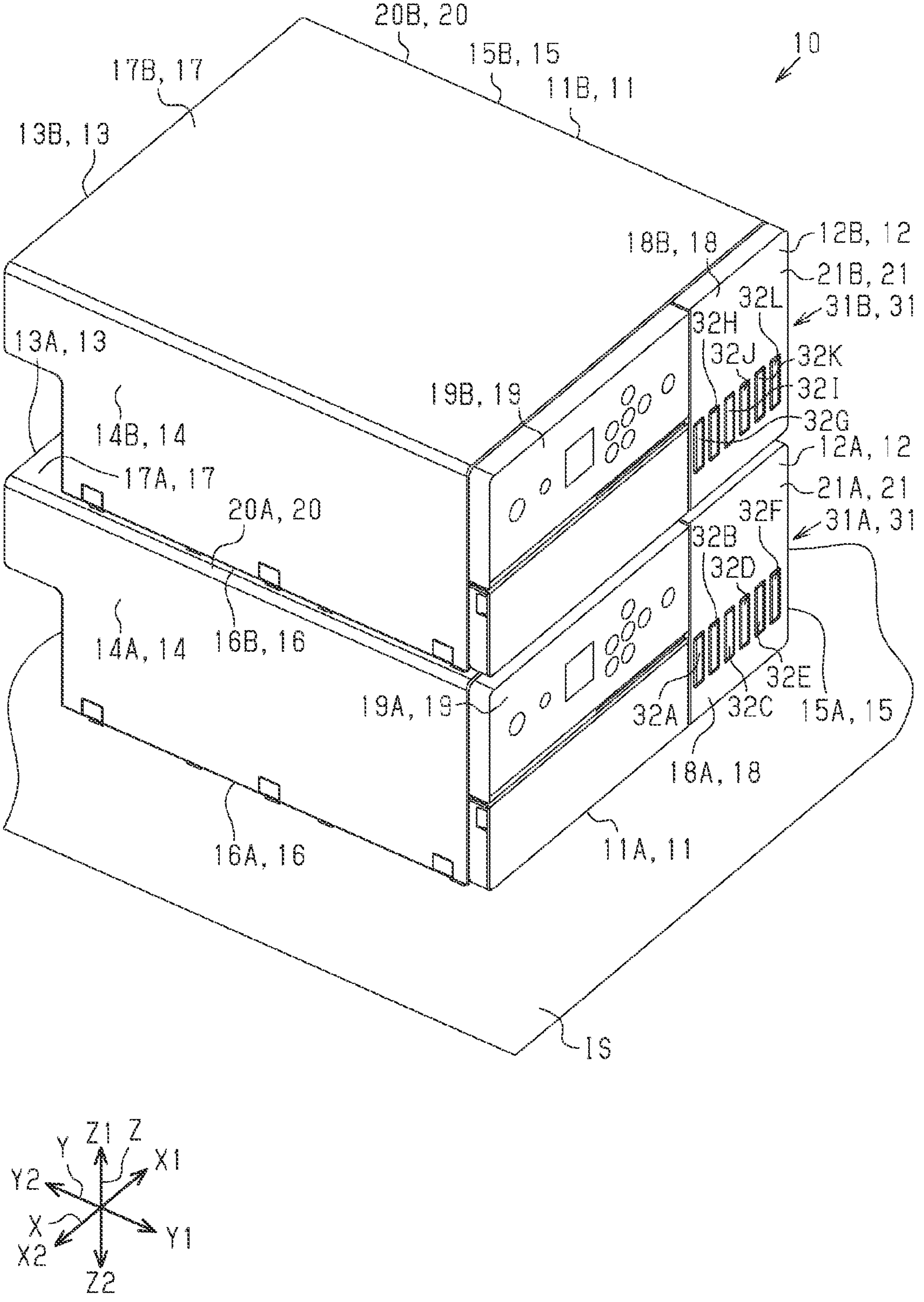
FIG. 1 is a perspective view of a recording system.

As illustrated in FIG. 1, a recording system 10 includes a plurality of recording apparatuses 11. Each of the plurality of recording apparatuses 11 is an apparatus that performs recording on a medium. Each of the plurality of recording apparatuses 11 may be an apparatus that performs recording on a medium by ejecting a liquid onto it. The liquid may be, for example, ink. The liquid may have, for example, a plurality of color types or a single color type. The medium may be, for example, paper.

The recording system 10 may include, for example, a first recording apparatus 11A and a second recording apparatus 11B. Alternatively, the recording system 10 may include three or more recording apparatuses 11, or one recording apparatus 11 only. The first recording apparatus 11A and the second recording apparatus 11B are the recording apparatuses 11 having an identical structure, an identical external shape, and identical functions.

The first recording apparatus 11A and the second recording apparatus 11B can be installed in the vertical direction Z.

More specifically, the first recording apparatus 11A is installed on an installation surface IS. The second recording apparatus 11B can be installed over (Z1) the first recording apparatus 11A in the vertical direction Z. That is, the second recording apparatus 11B can be stacked on a top surface 17A of the first recording apparatus 11A. The installation surface IS may be a top surface 17 of the recording apparatus 11. The installation surface IS may be a surface other than the top surface 17 of the recording apparatus 11.

Structure of Recording Apparatus 11

Figure 2:
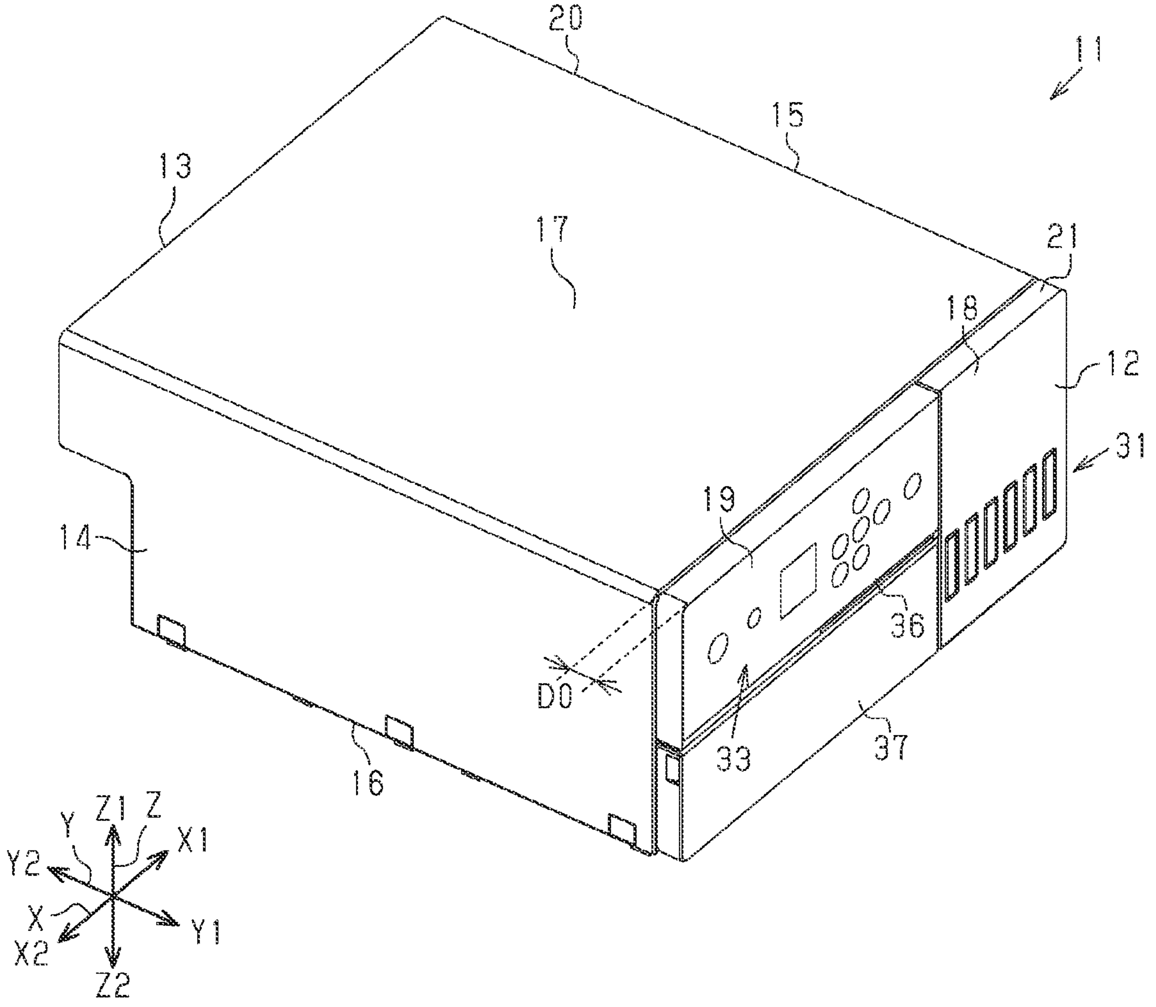
FIG. 2 is a perspective view of a recording apparatus.

As illustrated in FIG. 2, the recording apparatus 11 has a shape like a rectangular parallelepiped. The recording apparatus 11 has a front surface 12. The front surface 12 is a face oriented forward (Y1). The recording apparatus 11 has a rear surface 13. The rear surface 13 is a face oriented rearward (Y2). The recording apparatus 11 has a left side surface 14. The left side surface 14 is a face oriented in the second width direction X2. The recording apparatus 11 has a right side surface 15. The right side surface 15 is a face oriented in the first width direction X1. The recording apparatus 11 has a bottom surface 16. The bottom surface 16 is a face oriented downward (Z2). The recording apparatus 11 has the top surface 17. The top surface 17 is a face oriented upward (Z1).

As described above, the top surface 17 includes a flat surface on which an object to be stacked can be stacked. The object to be stacked thereon may be another recording apparatus 11 or a notebook computer. As long as the top surface 17 includes a flat surface on which the object to be stacked can be stacked, the top surface 17 may have a partially non-flat area; alternatively, the top surface 17 may be flat throughout the entire area.

The recording apparatus 11 includes a housing 20 and a body 21. The housing 20 is configured to house the body 21. The housing 20 constitutes at least a part of the left side surface 14, a part of the right side surface 15, a part of the bottom surface 16, and a part of the top surface 17 of the recording apparatus 11. The housing 20 may constitute at least the whole of the left side surface 14, the whole of the right side surface 15, the whole of the bottom surface 16, and the whole of the top surface 17 of the recording apparatus 11. As described here, the housing 20 includes the left side surface 14, the right side surface 15, the bottom surface 16, and the top surface 17 of the recording apparatus 11, namely, a plurality of faces. The left side surface 14, the right side surface 15, the bottom surface 16, and the top surface 17 of the recording apparatus 11 may be said as the left side surface, the right side surface, the bottom surface, and the top surface of the housing 20. The housing 20 may include at least a part of the front surface 12 of the recording apparatus 11. The housing 20 may include at least a part of the rear surface 13 of the recording apparatus 11.

The body 21 constitutes at least the whole of the front surface 12 of the recording apparatus 11.

Alternatively, the body 21 may constitute at least a part of the front surface 12 of the recording apparatus 11. As described here, the body 21 includes the front surface 12 of the recording apparatus 11. The front surface 12 of the recording apparatus 11 may be said as the front surface of the body 21. The rear surface 13 of the recording apparatus 11 may be comprised of the rear surface of the housing 20 and the rear surface of the body 21. Alternatively, the rear surface 13 of the recording apparatus 11 may be comprised of the rear surface of the housing 20 alone or the rear surface of the body 21 alone.

The body 21 is configured to be changed in position in the front-rear direction Y with respect to the housing 20. As described here, the front-rear direction Y corresponds to an example of "position-change direction". The front direction Y1 corresponds to an example of "first position-change direction". The rear direction Y2 corresponds to an example of "second position-change direction".

The body 21 can be put into a closed position. The closed position is a position at which the body 21 is housed inside the housing 20. The closed position is a position at which the body 21 protrudes from the housing 20 forward (Y1) by a predetermined distance D0. Alternatively, the closed position may be a position at which the body 21 does not protrude from the housing 20. That is, the body 21 constitutes a part of the left side surface 14, a part of the right side surface 15, a part of the bottom surface 16, and a part of the top surface 17 of the recording apparatus 11 but, alternatively, may be configured not to constitute the left side surface 14, the right side surface 15, the bottom surface 16, and the top surface 17 of the recording apparatus 11.

Figure 3:
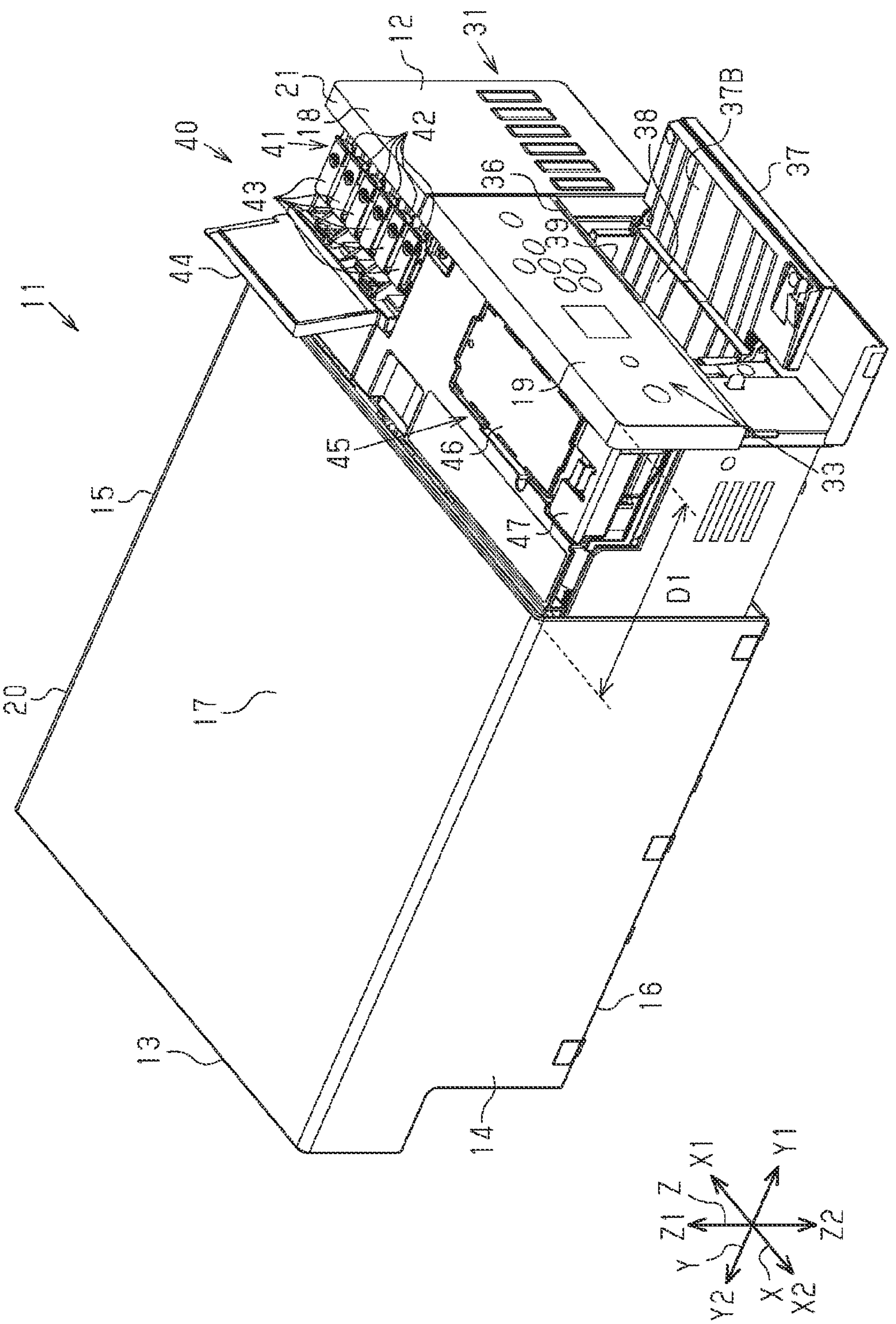
FIG. 3 is a perspective view of the recording apparatus.

As illustrated in FIG. 3, the body 21 is configured to be changed in position to a first open position. The first open position is an open position at which the body 21 protrudes from the housing 20 forward (Y1). More particularly, the first open position is a position at which the body 21 protrudes from the housing 20 forward (Y1) by a first distance D1. The first distance D1 is longer than the predetermined distance D0. As described here, at least a part of an inner portion of the body 21 is exposed to the outside from the housing 20 when the body 21 is located at the first open position.

Figure 4:
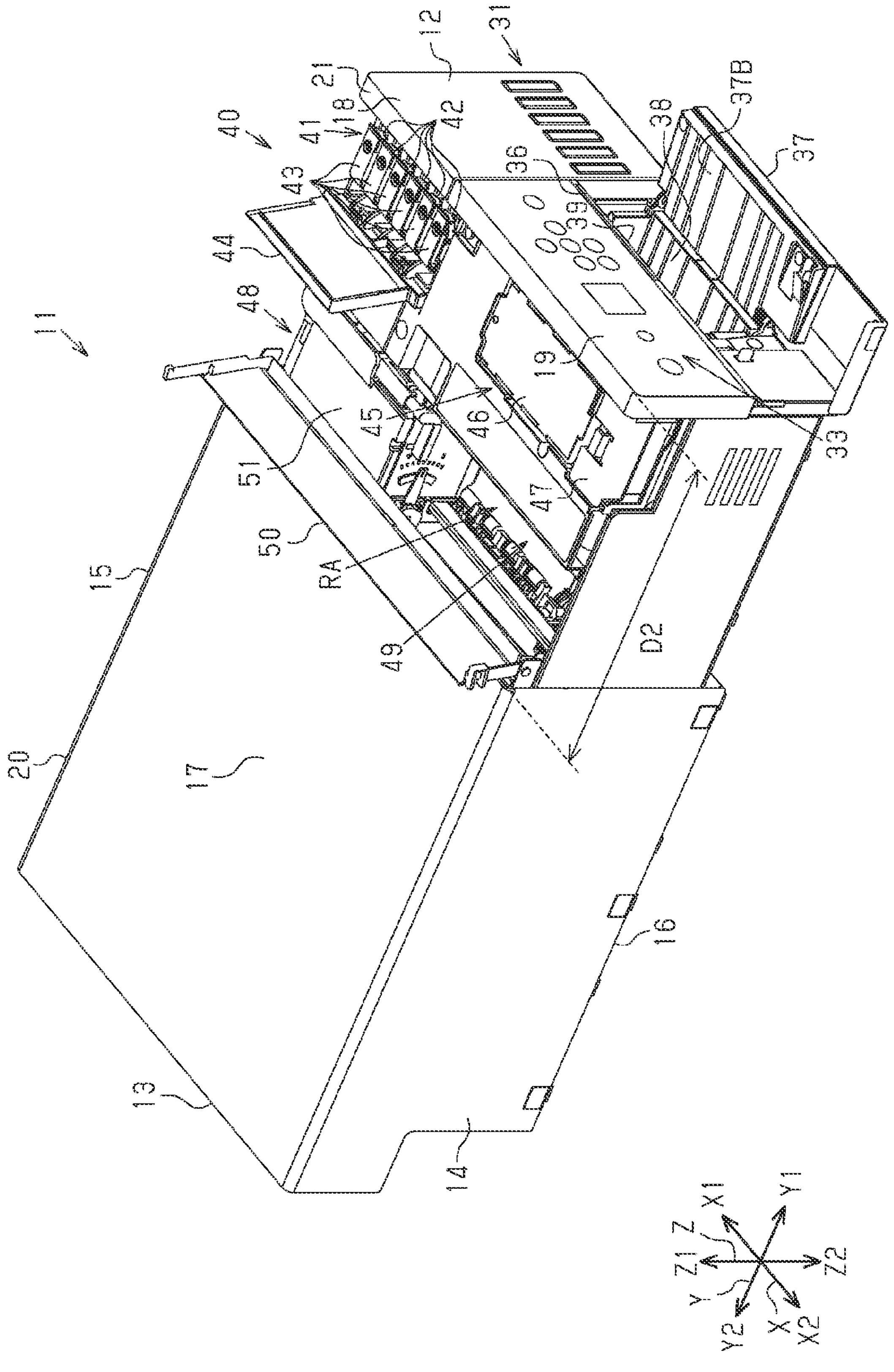
FIG. 4 is a perspective view of the recording apparatus.

As illustrated in FIG. 4, the body 21 is configured to be changed in position to a second open position. The second open position is another open position at which the body 21 protrudes from the housing 20 forward (Y1). More particularly, the second open position is a position at which the body 21 protrudes from the housing 20 forward (Y1) by a second distance D2. The second distance D2 is longer than the first distance D1. As described here, at least a part of the inner portion of the body 21 is exposed to the outside from the housing 20 when the body 21 is located at the second open position.

As described above, the body 21 is configured to be changed in position in the front-rear direction Y with respect to the housing 20 between the closed position, the first open position, and the second open position. More particularly, even when the second recording apparatus 11B is stacked on the top surface of the first recording apparatus 11A, in the first recording apparatus 11A, the body 21 is configured to be changed in position in the front-rear direction Y with respect to the housing 20.

Structure of Bottom Plate 22

Figure 5:
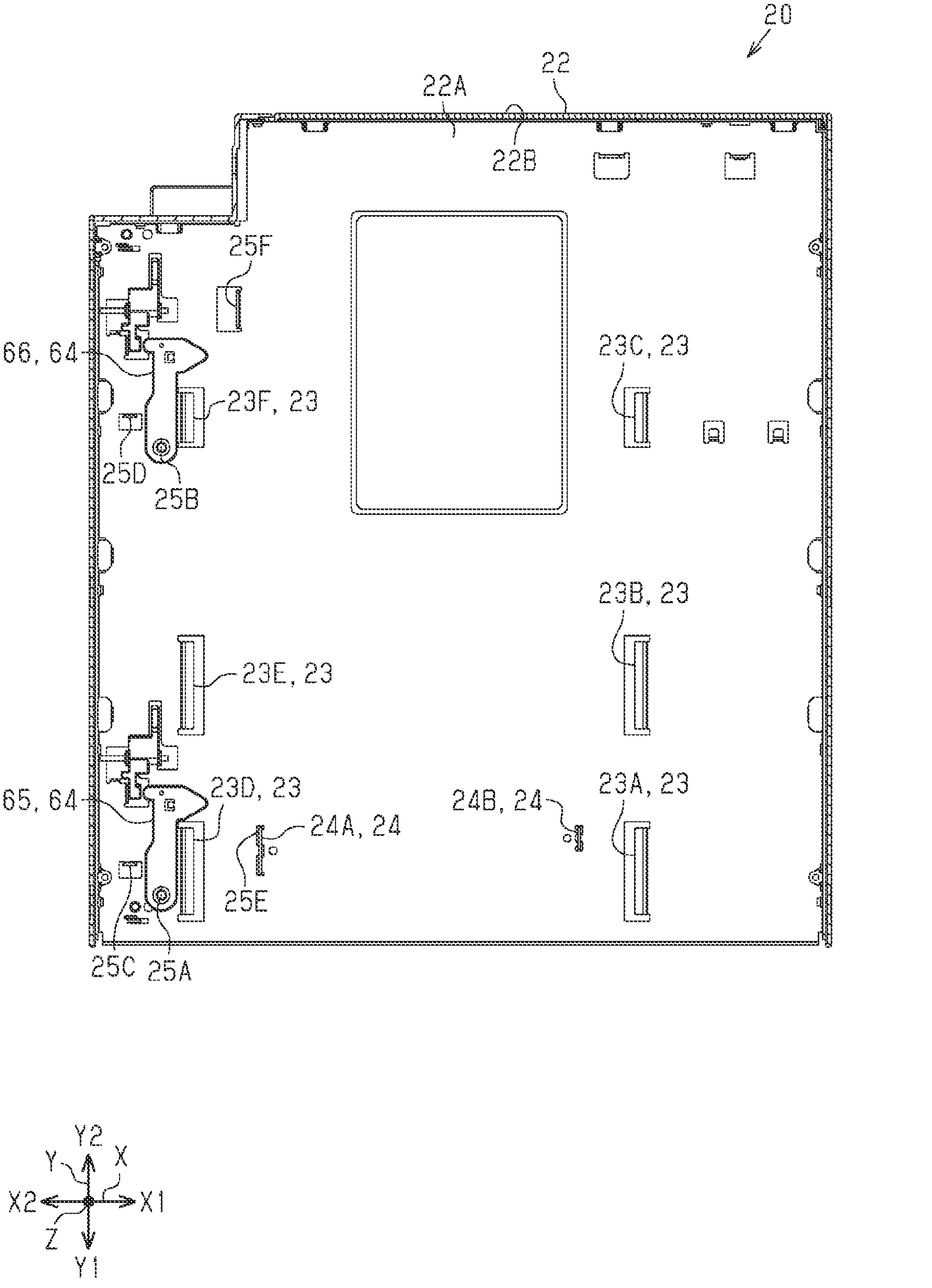
FIG. 5 is a plan view of a bottom plate.

As illustrated in FIG. 5, the housing 20 includes a bottom plate 22 that has a shape like a flat plate. The bottom plate 22 is made of metal. Alternatively, the bottom plate 22 may be made of resin, or both metal and resin. The bottom plate 22 has an upper surface 22A. The upper surface 22A is a surface oriented upward (Z1). The upper surface 22A corresponds to an example of "supporting surface" that supports the body 21 from below (Z2). That is, the supporting surface that supports the body 21 from below (Z2) is provided as the upper surface 22A of the bottom plate 22.

The bottom plate 22 has a bottom surface 22B. The bottom surface 22B is a surface oriented downward (Z2). The bottom surface 22B is the bottom surface 16 of the recording apparatus 11. That is, the housing 20 includes the bottom surface 16 of the recording apparatus 11.

The housing 20 includes a slide guide 23. The slide guide 23 is provided in such a way as to protrude upward (Z1)

from the upper surface 22A of the bottom plate 22. The slide guide 23 may be formed integrally with the bottom plate 22. The slide guide 23 extends in the front-rear direction Y. At least, the slide guide 23 restricts a change in position of the body 21 in the width direction X and guides a change in position of the body 21 in the front-rear direction Y.

The slide guide 23 may include a plurality of slide guides 23A to 23F. The plurality of slide guides 23A to 23F may include a first slide guide 23A, a second slide guide 23B, a third slide guide 23C, a fourth slide guide 23D, a fifth slide guide 23E, and a sixth slide guide 23F.

The first slide guide 23A, the second slide guide 23B, and the third slide guide 23C are provided along the front-rear direction Y. The fourth slide guide 23D, the fifth slide guide 23E, and the sixth slide guide 23F are provided along the front-rear direction Y. The first slide guide 23A, the second slide guide 23B, and the third slide guide 23C are provided relatively on a first-width-directional side X1 in relation to the fourth slide guide 23D, the fifth slide guide 23E, and the sixth slide guide 23F. More specifically, the first slide guide 23A is provided relatively on the first-width-directional side X1 in relation to the fourth slide guide 23D. The second slide guide 23B is provided relatively on the first-width-directional side X1 in relation to the fifth slide guide 23E. The third slide guide 23C is provided relatively on the first-width-directional side X1 in relation to the sixth slide guide 23F.

Each of the first slide guide 23A, the second slide guide 23B, and the third slide guide 23C protrudes upward (Z1) from the upper surface 22A of the bottom plate 22 and extends in the second width direction X2 from the upper end of the portion protruding upward (Z1).

Each of the first slide guide 23A, the second slide guide 23B, and the third slide guide 23C is located on the first-width-directional side X1 next to a second slide rail 61B of the body 21 to be described later. Therefore, each of the first slide guide 23A, the second slide guide 23B, and the third slide guide 23C is configured to restrict a change in position of the body 21 in the first width direction X1.

In addition, the portion extending in the second width direction X2 from the upper end of the portion protruding upward (Z1) of each of the first slide guide 23A, the second slide guide 23B, and the third slide guide 23C is located over (Z1) the second slide rail 61B of the body 21 to be described later. Therefore, each of the first slide guide 23A, the second slide guide 23B, and the third slide guide 23C is configured to restrict a change in position of the body 21 upward (Z1).

Each of the fourth slide guide 23D, the fifth slide guide 23E, and the sixth slide guide 23F protrudes upward (Z1) from the upper surface 22A of the bottom plate 22 and extends in the first width direction X1 from the upper end of the portion protruding upward (Z1).

Each of the fourth slide guide 23D, the fifth slide guide 23E, and the sixth slide guide 23F is located on a second-width-directional side X2 next to a first slide rail 61A of the body 21 to be described later. Therefore, each of the fourth slide guide 23D, the fifth slide guide 23E, and the sixth slide guide 23F is configured to restrict a change in position of the body 21 in the second width direction X2.

In addition, the portion extending in the first width direction X1 from the upper end of the portion protruding upward (Z1) of each of the fourth slide guide 23D, the fifth slide guide 23E, and the sixth slide guide 23F is located over (Z1) the first slide rail 61A of the body 21 to be described later. Therefore, each of the fourth slide guide 23D, the fifth slide guide 23E, and the sixth slide guide 23F is configured to restrict a change in position of the body 21 upward (Z1).

As described above, the slide guide 23 is an example of a third restricting portion that restricts a change in position of the body 21 in the width direction X. In addition, the slide guide 23 is an example of a contact portion configured to be in contact with the body 21 in the width direction X and from above (Z1).

The housing 20 includes a second restricting portion 24. The second restricting portion 24 is provided in such a way as to protrude upward (Z1) on the upper surface 22A of the bottom plate 22. The second restricting portion 24 may be formed integrally with the bottom plate 22. The second restricting portion 24 may include a first protruding portion 24A and a second protruding portion 24B. The first protruding portion 24A is provided relatively on a second-width-directional side X2 in relation to the second protruding portion 24B. The second restricting portion 24 restricts a change in position of the body 21 forward (Y1) when the body 21 is located at the second open position.

The housing 20 includes a plurality of rotation shafts 25A and 25B. Each of the plurality of rotation shafts 25A and 25B is provided in such a way as to protrude upward (Z1) on the upper surface 22A of the bottom plate 22. Each of the plurality of rotation shafts 25A and 25B may be formed integrally with the bottom plate 22.

The plurality of rotation shafts 25A and 25B may include a first rotation shaft 25A and a second rotation shaft 25B. The first rotation shaft 25A and the second rotation shaft 25B are provided along the front-rear direction Y. The first rotation shaft 25A is provided ahead of (Y1) the second rotation shaft 25B. The first rotation shaft 25A rotatably supports a first holding portion 65 to be described later. The second rotation shaft 25B rotatably supports a second holding portion 66 to be described later.

The housing 20 includes a plurality of fixing portions 25C and 25D. Each of the plurality of fixing portions 25C and 25D is provided in such a way as to protrude upward (Z1) on the upper surface 22A of the bottom plate 22. Each of the plurality of fixing portions 25C and 25D may be formed integrally with the bottom plate 22.

The plurality of fixing portions 25C and 25D may include a first fixing portion 25C and a second fixing portion 25D. The first fixing portion 25C is provided ahead of (Y1) the second fixing portion 25D. One end portion 67A of a first holding urging portion 67 to be described later is configured to be fixed to the first fixing portion 25C. One end portion 68A of a second holding urging portion 68 to be described later is configured to be fixed to the second fixing portion 25D.

The housing 20 may include a plurality of pressing surfaces 25E and 25F. Each of the plurality of pressing surfaces 25E and 25F is provided in such a way as to protrude upward (Z1) from the upper surface 22A of the bottom plate 22. Each of the plurality of pressing surfaces 25E and 25F may be formed integrally with the bottom plate 22. Each of the plurality of pressing surfaces 25E and 25F is a surface oriented in the second width direction X2. Each of the plurality of pressing surfaces 25E and 25F extends in the front-rear direction Y. The plurality of pressing surfaces 25E and 25F may include a first pressing surface 25E and a second pressing surface 25F. The first pressing surface 25E is provided ahead of (Y1) the second pressing surface 25F. The first pressing surface 25E is formed integrally with the first protruding portion 24A but is not limited thereto. Each of the plurality of pressing surfaces 25E and 25F is a surface against which the first slide rail 61A of the body 21 to be described later is pushed from the second-width-directional side X2.

Structure of Housing Frame 26

Figure 6:
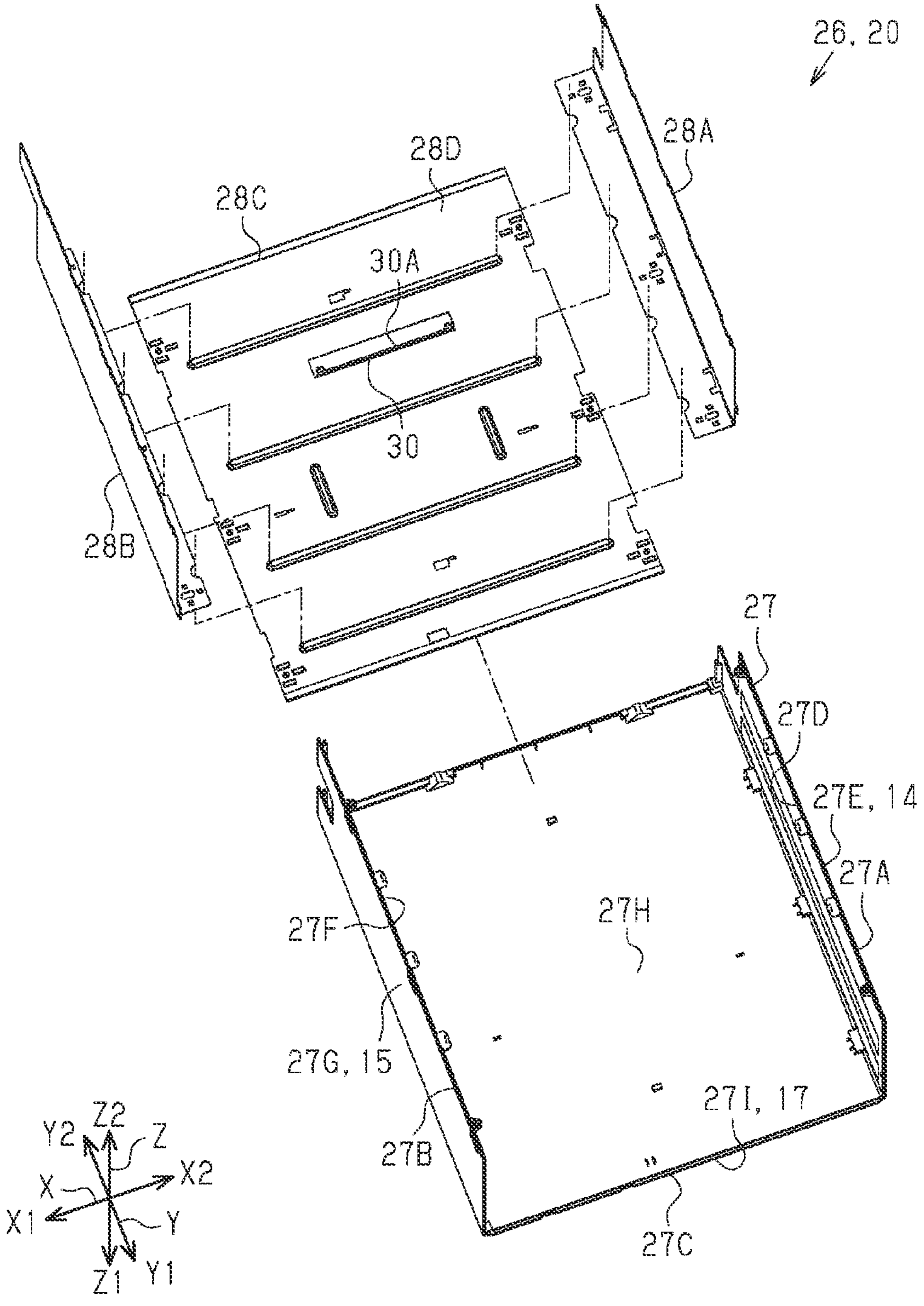
FIG. 6 is a perspective view of a housing frame.

As illustrated in FIG. 6, the housing 20 includes a housing frame 26. The housing frame 26 is a member that constitutes the left side surface 14, the right side surface 15, and the top surface 17 of the recording apparatus 11. That is, the housing 20 includes a plurality of faces, which are the left side surface 14, the right side surface 15, and the top surface 17 of the recording apparatus 11. The housing frame 26 is provided over (Z1) the upper surface 22A of the bottom plate 22.

The housing frame 26 includes a resin frame 27. The resin frame 27 includes a left side plate 27A, a right side plate 27B, and a top plate 27C. The left side plate 27A, the right side plate 27B, and the top plate 27C may be formed integrally with one another. The resin frame 27 constitutes the left side surface 14, the right side surface 15, and the top surface 17 of the recording apparatus 11. That is, the left side surface 14, the right side surface 15, and the top surface 17 of the recording apparatus 11 have a resin-plate structure.

The left side plate 27A has a left inner side surface 27D and a left outer side surface 27E. The left inner side surface 27D is, of the left side plate 27A, a surface oriented in the first width direction X1. The left outer side surface 27E is, of the left side plate 27A, a surface oriented in the second width direction X2 and constitutes the left side surface 14 of the recording apparatus 11.

The right side plate 27B has a right inner side surface 27F and a right outer side surface 27G. The right inner side surface 27F is, of the right side plate 27B, a surface oriented in the second width direction X2. The right outer side surface 27G is, of the right side plate 27B, a surface oriented in the first width direction X1 and constitutes the right side surface 15 of the recording apparatus 11.

The top plate 27C includes a bottom surface 27H and a top surface 27I. The bottom surface 27H is, of the top plate 27C, a surface oriented downward (Z2). The top surface 27I is, of the top plate 27C, a surface oriented upward (Z1) and constitutes the top surface 17 of the recording apparatus 11.

The housing frame 26 includes a plurality of metal plates 28A to 28C. Each of the plurality of metal plates 28A to 28C may be formed separately from, or integrally with, the others. The plurality of metal plates 28A to 28C may include a first metal plate 28A, a second metal plate 28B, and a third metal plate 28C.

The metal plates 28A to 28C are provided inside the left side plate 27A of the resin frame 27, inside the right side plate 27B of the resin frame 27, and inside the top plate 27C of the resin frame 27, respectively. More specifically, the first metal plate 28A is provided along the left inner side surface 27D of the left side plate 27A. The second metal plate 28B is provided along the right inner side surface 27F of the right side plate 27B. The third metal plate 28C is provided along the bottom surface 27H of the top plate 27C. That is, the housing 20 is configured such that the metal plates 28A to 28C are provided inside the resin frame 27.

The housing 20 includes a first restricting portion 30. The first restricting portion 30 may be provided on a bottom surface 28D of the third metal plate 28C in such a way as to protrude downward (Z2). The first restricting portion 30 may be formed integrally with the third metal plate 28C. As described here, the first restricting portion 30 is provided on the housing 20. The first restricting portion 30 has a contact target surface 30A. The contact target surface 30A is a surface oriented rearward (Y2). When the body 21 is located at the first open position, the contact target surface 30A restricts a change in position of the body 21 forward (Y1) by being in contact with a first change-in-position restricting portion 59 of the body 21 to be described later. As described here, the first restricting portion 30 restricts a change in position of the body 21 forward (Y1) when the body 21 is located at the first open position.

Structure of Front Surface 12

Figure 7:
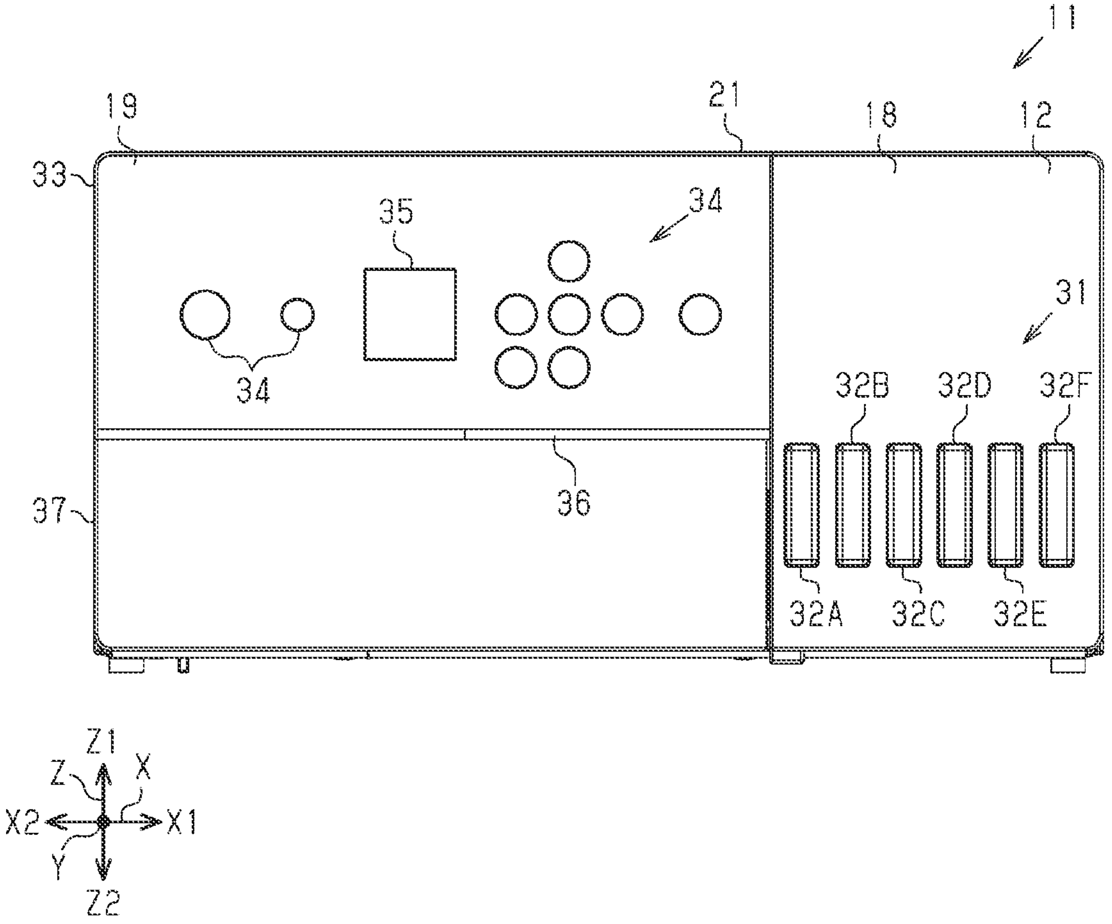
FIG. 7 is a front view of the recording apparatus.

As illustrated in FIG. 7, the front surface 12 of the body 21 includes a first area 18 and a second area 19. The first area 18 and the second area 19 are split areas adjacent to each other in the width direction X on the front surface 12. The first area 18 is an area that has a first color. The second area 19 is an area that has a second color different from the first color. As described here, the first area 18 and the second area 19 are colored so as to make it easier to identify various functions on the front surface 12. For example, the first color may be a black-based color, and the second color may be a white-based color; however, the first color and the second color are not limited to this example. The first color may be a color the lightness of which is lower than that of the second color. The first color may be a color the lightness of which is higher than that of the second color. For example, when the first color is a color the lightness of which is lower than that of the second color, it is easier to visually confirm the liquid because of a contrast with the colors of the liquid confirmed visually through visual confirmation windows 32A to 32F, which will be described below. When the first color is a color the lightness of which is higher than that of the second color, an external shape of a content amount visual confirmation portion 31, which will be described below, will look sharper, making it easier to recognize the content amount visual confirmation portion 31.

The recording apparatus 11 includes the content amount visual confirmation portion 31. The content amount visual confirmation portion 31 is provided on the body 21. That is, the content amount visual confirmation portion 31 is mounted on the body 21. The content amount visual confirmation portion 31 makes an amount of the liquid contained in a liquid container portion 40 to be described later visible. The content amount visual confirmation portion 31 is comprised of the plurality of visual confirmation windows 32A to 32F corresponding to the liquid of the respective colors. The plurality of visual confirmation windows 32A to 32F may include a first visual confirmation window 32A, a second visual confirmation window 32B, a third visual confirmation window 32C, a fourth visual confirmation window 32D, a fifth visual confirmation window 32E, and a sixth visual confirmation window 32F. The content amount visual confirmation portion 31 is located on the front surface 12 of the recording apparatus 11. More particularly, the content amount visual confirmation portion 31 is located at the first area 18 on the front surface 12 of the recording apparatus 11.

Each of the plurality of visual confirmation windows 32A to 32F extends in the vertical direction Z. Each of the plurality of visual confirmation windows 32A to 32F has a translucency. Each of the plurality of visual confirmation windows 32A to 32F may be transparent. With regard to a property of a matter that allows light to pass through itself, the term "transparent" as used herein means the following property: the matter has a transmission factor that is extremely high and, therefore, things on the far side behind the matter can be seen through the matter. The phrase "has a translucency" as used herein means that, although the matter has a property of allowing light to pass through itself as is the case with being "transparent", the shape, etc. of things on the far side behind the matter cannot be clearly recognized through the matter or cannot be recognized at all through the matter because of diffusion of transmitted light or because of a low transmission factor, unlike being "transparent".

The recording apparatus 11 includes an operation panel 33. The operation panel 33 is provided on the body 21. The operation panel 33 includes an operation unit 34 and a display unit 35. That is, the operation unit 34 and the display unit 35 are mounted on the body 21. The operation unit 34 is operable by users. The operation unit 34 may be comprised of a plurality of operation buttons. The display unit 35 displays information about the recording apparatus 11. The operation panel 33 is located on the front surface 12 of the recording apparatus 11. More particularly, the operation panel 33 is located at the second area 19 on the front surface 12 of the recording apparatus 11. That is, the operation unit 34 and the display unit 35 are provided in the second area 19. One and the same dual-function component such as a touch panel may double as the operation unit 34 and the display unit 35.

The recording apparatus 11 includes a notification lamp 36. The notification lamp 36 is provided on the body 21. The notification lamp 36 is a lamp for notification of information about the recording apparatus 11. The notification lamp 36 may be a lamp for notification of error information about the recording apparatus 11.

The notification lamp 36 is located on the front surface 12 of the recording apparatus 11. More particularly, the notification lamp 36 is located at the second area 19 on the front surface 12 of the recording apparatus 11. More specifically, in the second area 19, the notification lamp 36 is located below (Z2) the operation panel 33 between the operation panel 33 and an open/close portion 37, which will be described below. The notification lamp 36 extends in the width direction X.

The recording apparatus 11 includes the open/close portion 37. The open/close portion 37 is provided on the body 21. The open/close portion 37 is located on the front surface 12 of the recording apparatus 11. More particularly, the open/close portion 37 is located at the second area 19 on the front surface 12 of the recording apparatus 11. More specifically, in the second area 19, the open/close portion 37 is located below (Z2) the operation panel 33 and the notification lamp 36.

Figure 8:
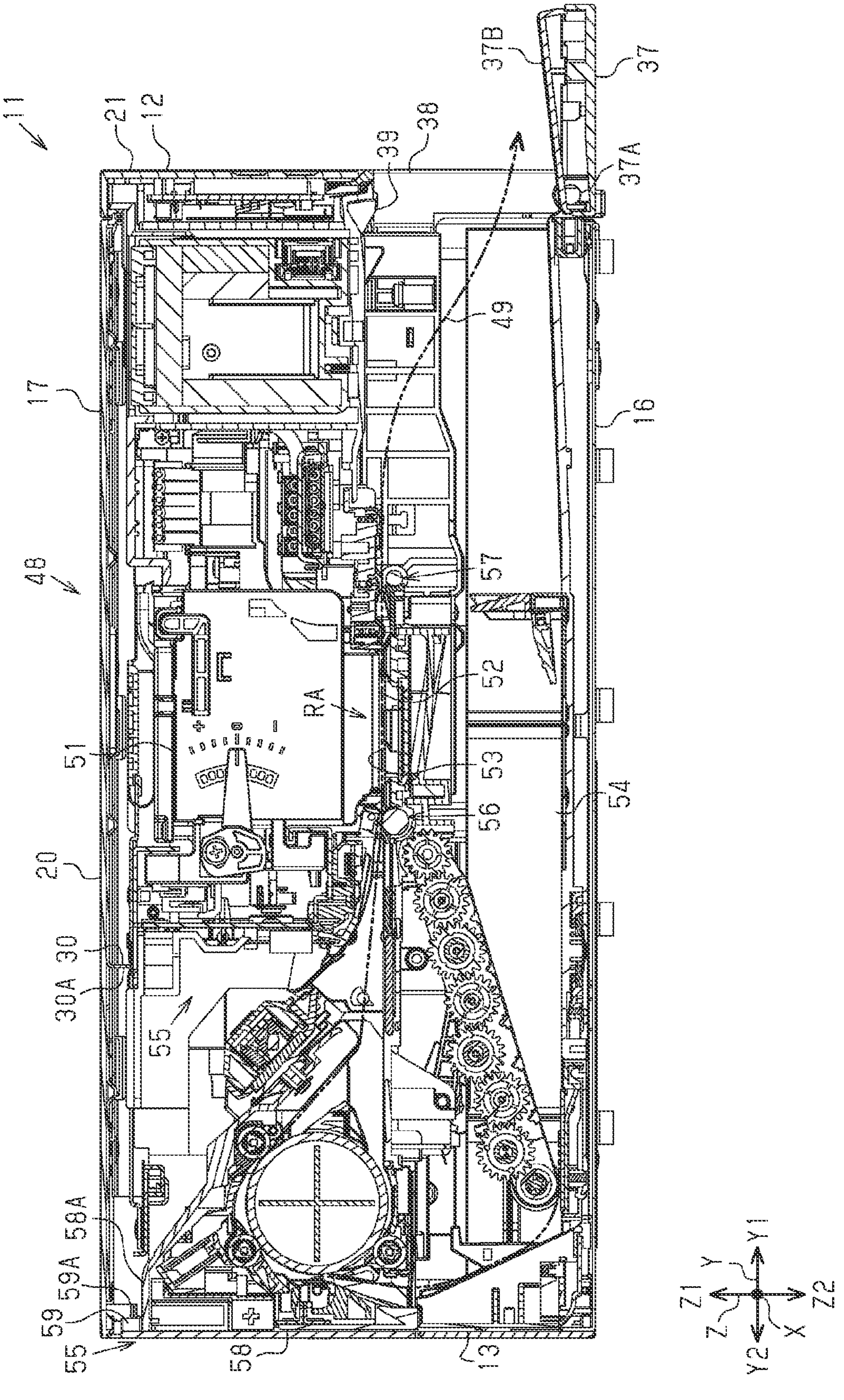
FIG. 8 is a cross-sectional view of the recording apparatus.

As illustrated in FIG. 8, the open/close portion 37 is capable of being turned around a rotation axis 37A provided at its lower end portion and extending in the width direction X. Having this structure, the open/close portion 37 can be opened away from, and closed toward, the front surface 12 of the recording apparatus 11.

As illustrated in FIGS. 3 and 8, the recording apparatus 11 includes an exit port 38. The exit port 38 is provided in the body 21. The exit port 38 is an opening through which a medium after recording by a recording unit 48 to be described later goes out. The exit port 38 is open at the front (Y1) of the recording apparatus 11. That is, the exit port 38 is provided in the front surface 12 of the recording apparatus 11 as an opening oriented forward (Y1). In other words, the exit port 38 is provided in the front surface of the body 21 as an opening oriented forward (Y1).

The exit port 38 is exposed at the front (Y1) of the recording apparatus 11 when the open/close portion 37 is open. The exit port 38 is not exposed when the open/close portion 37 is closed. Alternatively, the exit port 38 may be exposed also when the open/close portion 37 is closed. The exit port 38 is located on the second-width-directional side X2 with respect to the liquid container portion 40 to be described later.

The recording apparatus 11 includes a sheet ejection tray 37B. The sheet ejection tray 37B is provided on the body 21. The sheet ejection tray 37B is provided as an inner wall surface of the open/close portion 37. The sheet ejection tray 37B is exposed when the open/close portion 37 is open. Sheets of the medium after recording can be stacked on the sheet ejection tray 37B. The sheet ejection tray 37B may be configured such that it can be extended and retracted in the front-rear direction Y.

The recording apparatus 11 includes a grip portion 39. The grip portion 39 is provided on the body 21. The grip portion 39 is provided over (Z1) the exit port 38. The grip portion 39 is provided inside the front surface 12 of the recording apparatus 11 at a position where it can be gripped by a user from ahead thereof (Y1). That is, the grip portion 39 is provided inside the forward-oriented (Y1) face of the body 21 at a position where it can be gripped by the user from ahead thereof (Y1). As described here, the grip portion 39 can be gripped by the user when the user changes the position of the body 21 in the front-rear direction Y. In particular, even when two or more recording apparatuses 11 are stacked one on another in the vertical direction Z or when two or more recording apparatuses 11 are arranged horizontally in the width direction X, the grip portion 39 can be gripped by the user easily from ahead thereof (Y1).

Stack Structure of Plurality of Recording Apparatuses 11A and 11B

The following case will be described below; as illustrated in FIG. 1, the second recording apparatus 11B is stacked on the top surface 17A of the first recording apparatus 11A, the body 21A of the first recording apparatus 11A is located at the closed position, and the body 21B of the second recording apparatus 11B is located at the closed position.

In this case, the front surface 12A of the first recording apparatus 11A and the front surface 12B of the second recording apparatus 11B are included in the same plane. In addition, the left side surface 14A of the first recording apparatus 11A and the left side surface 14B of the second recording apparatus 11B are included in the same plane. Similarly, the right side surface 15A of the first recording apparatus 11A and the right side surface 15B of the second recording apparatus 11B are included in the same plane.

In addition, the first area 18A of the first recording apparatus 11A and the first area 18B of the second recording apparatus 11B are located such that they overlap with each other in the vertical direction Z. Moreover, the second area 19A of the first recording apparatus 11A and the second area 19B of the second recording apparatus 11B are located such that they overlap with each other in the vertical direction Z. The phrase "overlap with each other in the vertical direction Z" as used herein means that the other is located above (Z1) one, and, in addition, the one and the other are located at least partially at the same area in the width direction X.

Moreover, the content amount visual confirmation portion 31A of the first recording apparatus 11A and the content amount visual confirmation portion 31B of the second recording apparatus 11B are located such that they overlap with each other in the vertical direction Z. More specifically, the first visual confirmation window 32A of the first recording apparatus 11A and the first visual confirmation window 32G of the second recording apparatus 11B are located such that they overlap with each other in the vertical direction Z. The second visual confirmation window 32B of the first recording apparatus 11A and the second visual confirmation window 32H of the second recording apparatus 11B are located such that they overlap with each other in the vertical direction Z. The third visual confirmation window 32C of the first recording apparatus 11A and the third visual confirmation window 32I of the second recording apparatus 11B are located such that they overlap with each other in the vertical direction Z. The fourth visual confirmation window 32D of the first recording apparatus 11A and the fourth visual confirmation window 32J of the second recording apparatus 11B are located such that they overlap with each other in the vertical direction Z. The fifth visual confirmation window 32E of the first recording apparatus 11A and the fifth visual confirmation window 32K of the second recording apparatus 11B are located such that they overlap with each other in the vertical direction Z. The sixth visual confirmation window 32F of the first recording apparatus 11A and the sixth visual confirmation window 32L of the second recording apparatus 11B are located such that they overlap with each other in the vertical direction Z.

Structure of Body 21 at First Open Position

Figure 9:
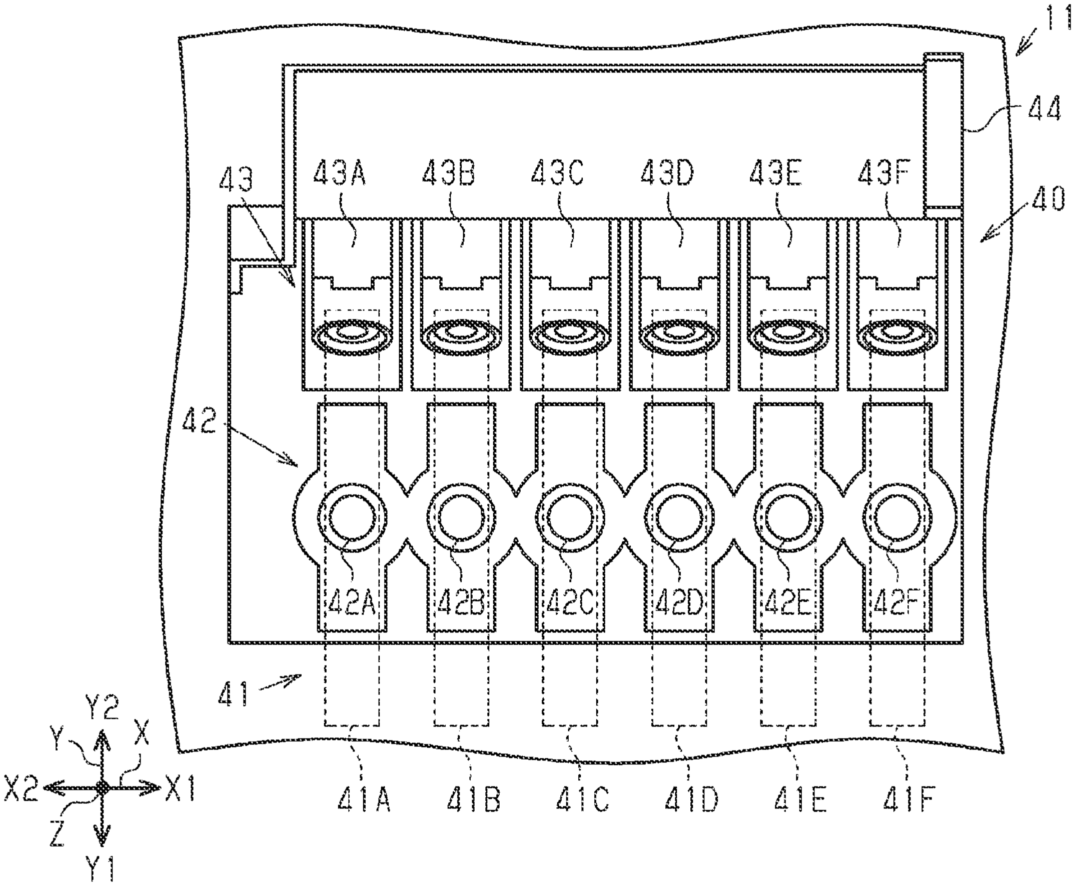
FIG. 9 is a plan view of a liquid container portion.

As illustrated in FIGS. 3 and 9, the recording apparatus 11 includes the liquid container portion 40. The liquid container portion 40 is mounted in the body 21. The liquid container portion 40 is configured to contain a liquid to be used for performing recording on a medium. That is, the liquid container portion 40 is configured to contain a liquid to be supplied to the recording unit 48 to be described later. The liquid container portion 40 may be a tank-type container portion into which a liquid can be poured. The liquid container portion 40 is provided next to the exit port 38 and the grip portion 39 in the width direction X. The liquid container portion 40 is provided next to a waste-liquid-container attachment portion 45 to be described later in the width direction X.

The liquid container portion 40 has a container space 41. The container space 41 is configured to contain a liquid. The liquid container portion 40 may have a plurality of container spaces 41A to 41F corresponding to the liquid of the respective colors. The plurality of container spaces 41A to 41F may include a first container space 41A, a second container space 41B, a third container space 41C, a fourth container space 41D, a fifth container space 41E, and a sixth container space 41F.

The liquid container portion 40 has a liquid inlet 42. The liquid inlet 42 is an opening through which a liquid can be poured into the container space 41. The liquid container portion 40 may have a plurality of liquid inlets 42A to 42F corresponding to the liquid of the respective colors. The plurality of liquid inlets 42A to 42F may include a first liquid inlet 42A, a second liquid inlet 42B, a third liquid inlet 42C, a fourth liquid inlet 42D, a fifth liquid inlet 42E, and a sixth liquid inlet 42F.

The liquid container portion 40 may have a cap 43. The cap 43 covers the liquid inlet 42. The cap 43 is capable of suppressing drying in the container space 41 by hermetically closing the container space 41. The liquid container portion 40 may have a plurality of caps 43A to 43F corresponding to the liquid of the respective colors. The plurality of caps 43A to 43F may include a first cap 43A, a second cap 43B, a third cap 43C, a fourth cap 43D, a fifth cap 43E, and a sixth cap 43F. Removing the cap 43 from the liquid inlet 42 enables the user to pour the liquid into the container space 41 through the liquid inlet 42.

The liquid container portion 40 may include a first cover portion 44. The first cover portion 44 has an openable-and-closeable structure. The container space 41 and the cap 43 are covered by the first cover portion 44 from above (Z1) when the first cover portion 44 is closed. The cap 43 is accessible to the user when the first cover portion 44 is open. As described here, the user is able to remove the cap 43 from the liquid inlet 42 when the first cover portion 44 is open.

The liquid container portion 40 is not exposed to the outside from the housing 20 when the body 21 is located at the closed position. In other words, the liquid inlet 42 is not exposed to the outside from the housing 20 when the body 21 is located at the closed position.

On the other hand, the liquid container portion 40 is exposed to the outside from the housing 20 when the body 21 is located at the first open position. As described here, the liquid inlet 42 becomes exposed to the outside from the housing 20 by removing the cap 43 therefrom after opening the first cover portion 44 when the body 21 is located at the first open position. This makes it possible to pour the liquid into the container space 41 through the liquid inlet 42.

Moreover, as illustrated in FIG. 4, also when the body 21 is located at the second open position, the same can be said about the liquid container portion 40 as when the body 21 is located at the first open position. As described here, the liquid inlet 42 becomes exposed to the outside from the housing 20 by removing the cap 43 therefrom after opening the first cover portion 44, also when the body 21 is located at the second open position. This makes it possible to pour the liquid into the container space 41 through the liquid inlet 42.

As described above, the liquid container portion 40 is exposed to the outside from the housing 20 when the body 21 is located at an open position. In other words, the liquid inlet 42 is exposed to the outside from the housing 20 when the body 21 is located at an open position. In addition, it is possible to provide a space over (Z1) the liquid container portion 40 when the body 21 is located at the open position, at which the liquid container portion 40 is exposed to the outside from the housing 20. This enhances operability, for example, makes it easier to set the container that contains the liquid in erect position in a self-supported manner, with its spout inserted in the liquid inlet 42.

Figure 10:
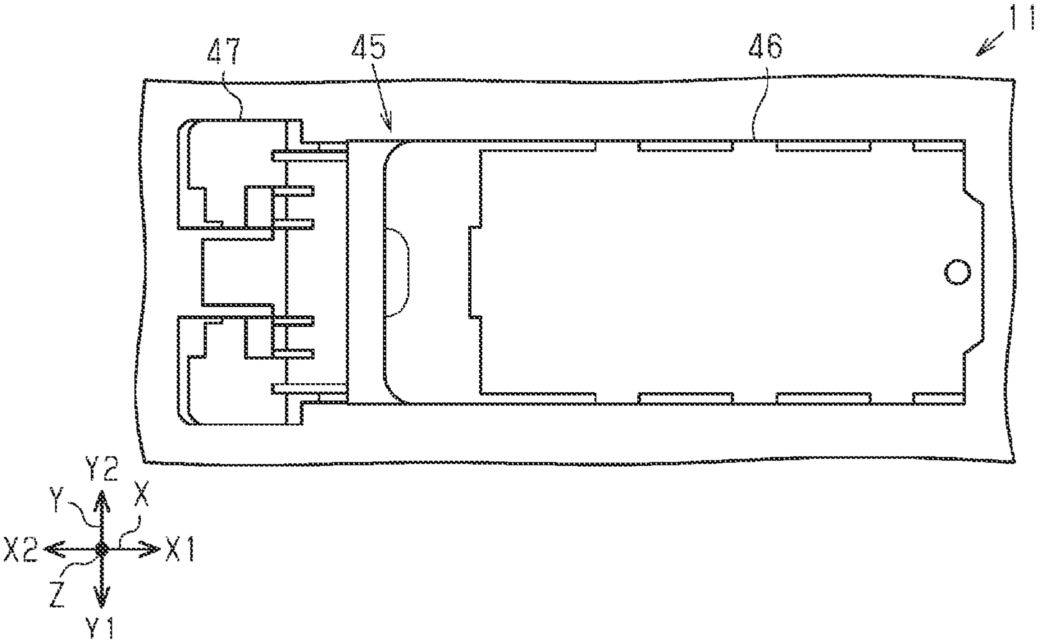
FIG. 10 is a plan view of a waste-liquid-container attachment portion.

As illustrated in FIGS. 3 and 10, the recording apparatus 11 includes the waste-liquid-container attachment portion 45. A waste liquid container 46 can be attached to the waste-liquid-container attachment portion 45. A liquid discharged as a waste liquid from the recording unit 48 to be described later can be collected by means of a non-illustrated maintenance device into the waste liquid container 46.

The waste-liquid-container attachment portion 45 is mounted in the body 21. The waste-liquid-container attachment portion 45 is provided over (Z1) the exit port 38. The waste-liquid-container attachment portion 45 is provided next to the liquid container portion 40 in the width direction X.

The waste-liquid-container attachment portion 45 has a container fixing portion 47. The container fixing portion 47 is configured to fix the waste liquid container 46 attached to the waste-liquid-container attachment portion 45. The container fixing portion 47 can be changed in position between a position for fixing the waste liquid container 46 attached to the waste-liquid-container attachment portion 45 and a position for making the waste liquid container 46 detachable from the waste-liquid-container attachment portion 45.

The waste-liquid-container attachment portion 45 is not exposed to the outside from the housing 20 when the body 21 is located at the closed position. On the other hand, the waste-liquid-container attachment portion 45 is exposed to the outside from the housing 20 when the body 21 is located at the first open position. As described here, the waste-liquid-container attachment portion 45 is exposed to the outside from the housing 20 when the body 21 is located at the first open position. This makes it possible to attach the waste liquid container 46 to, and detach the waste liquid container 46 from, the waste-liquid-container attachment portion 45.

As illustrated in FIG. 4, also when the body 21 is located at the second open position, the same can be said about the waste-liquid-container attachment portion 45 as when the body 21 is located at the first open position. That is, the waste-liquid-container attachment portion 45 is exposed to the outside from the housing 20 when the body 21 is located at an open position. The waste-liquid-container attachment portion 45 corresponds to an example of "second attachment portion".

Structure of Body 21 at Second Open Position

As illustrated in FIG. 4, the recording apparatus 11 includes the recording unit 48. The recording unit 48 is configured to perform recording on a medium by ejecting a liquid onto the medium. The recording unit 48 is mounted in the body 21. The recording unit 48 is provided next to the liquid container portion 40 in the front-rear direction Y. The recording unit 48 is provided behind (Y2) the liquid container portion 40.

The recording unit 48 is exposed to the outside from the housing 20 when the body 21 is located at the second open position. More particularly, a carriage 51, which will be described below, of the recording unit 48 is exposed to the outside from the housing 20 when the body 21 is located at the second open position. The recording unit 48 is not exposed to the outside from the housing 20 when the body 21 is located at the closed position, nor at the first open position.

The recording apparatus 11 includes a transportation path 49. The transportation path 49 is a path along which the medium is transported. The transportation path 49 is provided in the body 21. A part of the transportation path 49 is exposed to the outside from the housing 20 when the body 21 is located at the second open position. More particularly, of the transportation path 49, a recording area RA, at which recording onto the medium is performed by the recording unit 48, is exposed to the outside from the housing 20 when the body 21 is located at the second open position. The part of the transportation path 49 is not exposed to the outside from the housing 20 when the body 21 is located at the closed position, nor at the first open position.

The recording apparatus 11 may include a second cover portion 50. The second cover portion 50 is provided on the body 21. The second cover portion 50 has an openable-and-closeable structure. The recording unit 48 and the part of the transportation path 49 are covered by the second cover portion 50 from above (Z1) when the second cover portion 50 is closed. A maintenance, etc. on the recording unit 48 and the part of the transportation path 49 can be performed by the user when the second cover portion 50 is open. For example, a jammed sheet of paper can be removed when the second cover portion 50 is open.

As illustrated in FIG. 8, the recording unit 48 includes the carriage 51 and a liquid ejecting head 52. The carriage 51 supports the liquid ejecting head 52 from above (Z1). The liquid ejecting head 52 is provided under (Z2) the carriage 51. That is, the liquid ejecting head 52 is mounted on the bottom of the carriage 51.

The liquid ejecting head 52 has a plurality of non-illustrated nozzles. Each of the plurality of nozzles has an opening oriented toward a medium supported by a supporting portion 53 to be described below. Each of the plurality of nozzles is configured to eject a liquid. The liquid ejecting head 52 ejects the liquid from the plurality of nozzles toward the medium supported by the supporting portion 53. As described here, the recording unit 48 is configured to perform recording on the medium by ejecting the liquid onto the medium. The liquid ejecting head 52 is a serial head that ejects the liquid while the carriage 51 moves in the width direction X. Alternatively, the liquid ejecting head 52 may be a line head.

The recording apparatus 11 includes the supporting portion 53. The supporting portion 53 is mounted in the body 21. The supporting portion 53 is configured to support a medium. More particularly, the supporting portion 53 supports the medium at the recording area RA, at which recording onto the medium is performed by the recording unit 48.

The recording apparatus 11 includes a sheet feeding tray 54. The sheet feeding tray 54 is a tray on which sheets of a medium can be placed. The sheet feeding tray 54 is mounted on the body 21. The sheet feeding tray 54 can be changed in position from the body 21 in the front-rear direction Y. By being drawn out of the body 21 in the front-rear direction Y, the sheet feeding tray 54 is put into a state in which the medium can be placed and the medium can be taken out.

The recording apparatus 11 includes a transporting portion 55. The transporting portion 55 is configured to transport a medium. The transporting portion 55 is mounted in the body 21. The transporting portion 55 feeds sheets of the medium placed on the sheet feeding tray 54 one by one. The transporting portion 55 transports the fed sheet of the medium along the transportation path 49.

The transporting portion 55 includes a plurality of rollers and a plurality of motors serving as a driving source. In particular, the transporting portion 55 includes a pair of transporting rollers 56. The pair of transporting rollers 56 is located upstream of the supporting portion 53 on the transportation path 49. The pair of transporting rollers 56 transports the medium to the supporting portion 53 along the transportation path 49. The transporting portion 55 includes a pair of ejecting rollers 57. The pair of ejecting rollers 57 is located downstream of the supporting portion 53 on the transportation path 49. The pair of ejecting rollers 57 ejects the medium after recording along the transportation path 49.

The transporting portion 55 includes a reversing portion 58. That is, the reversing portion 58 is mounted in the body 21. The reversing portion 58 is configured to be detachably attached to the body 21 from behind (Y2) of it. The reversing portion 58 includes a plurality of rollers. The reversing portion 58 is configured to reverse the direction in which the medium is transported along the transportation path 49.

The reversing portion 58 includes the first change-in-position restricting portion 59. The first change-in-position restricting portion 59 is provided integrally with the reversing portion 58. The first change-in-position restricting portion 59 is provided at the rear (Y2) end of the reversing portion 58 as an upper end portion 58A of the reversing portion 58. The first change-in-position restricting portion 59 protrudes upward (Z1). The first change-in-position restricting portion 59 is located behind (Y2) the first restricting portion 30 of the housing 20 in the front-rear direction Y.

The first change-in-position restricting portion 59 has a contact surface 59A. The contact surface 59A is a surface oriented forward (Y1). The contact surface 59A is oriented toward the contact target surface 30A of the first restricting portion 30 in the front-rear direction Y. The contact surface 59A is not in contact with the contact target surface 30A when the body 21 is located at the closed position. That is, the first change-in-position restricting portion 59 is not in contact with the first restricting portion 30 when the body 21 is located at the closed position.

Figure 11:
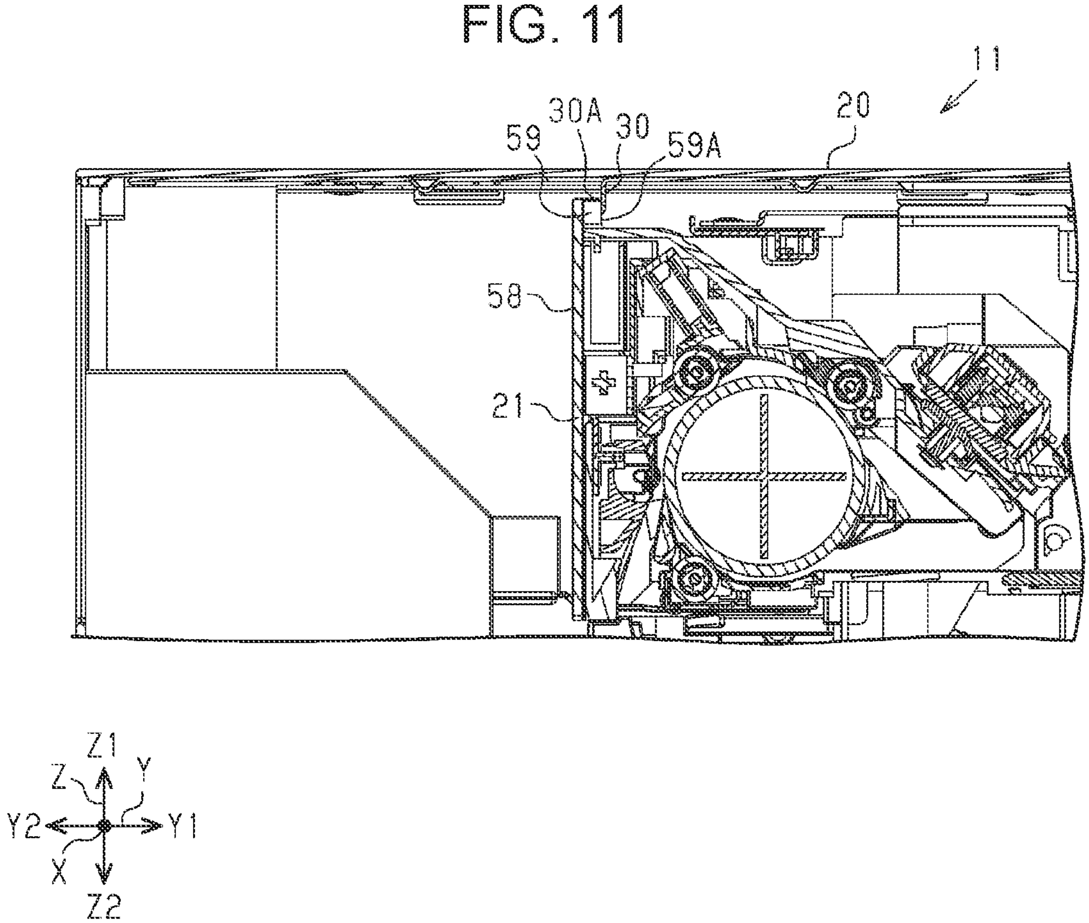
FIG. 11 is a cross-sectional view of a reversing portion.

As illustrated in FIG. 11, the first change-in-position restricting portion 59 is in contact with the first restricting portion 30 when the body 21 is located at the first open position. More specifically, the contact surface 59A is in contact with the contact target surface 30A when the body 21 is located at the first open position. As described here, the first change-in-position restricting portion 59 is in contact with the first restricting portion 30 in the front-rear direction Y when the body 21 is located at the first open position, and this contact restricts a change in position of the body 21 forward (Y1).

On the other hand, when the reversing portion 58 is not attached to the body 21, the first change-in-position restricting portion 59 is not mounted in the body 21. Therefore, when the reversing portion 58 is not attached to the body 21, a change in position of the body 21 forward (Y1) is not restricted even when the body 21 is located at the first open position. That is, when the reversing portion 58 is attached to the body 21, a change in position of the body 21 forward (Y1) from the first open position is restricted due to the contact of the reversing portion 58 and the first restricting portion 30. As described here, by attachment and detachment of the reversing portion 58 to and from the body 21, it is possible to switch whether a change in position of the body 21 forward (Y1) from the first open position is restricted or not.

Detailed Structure of Body 21

Figure 12:
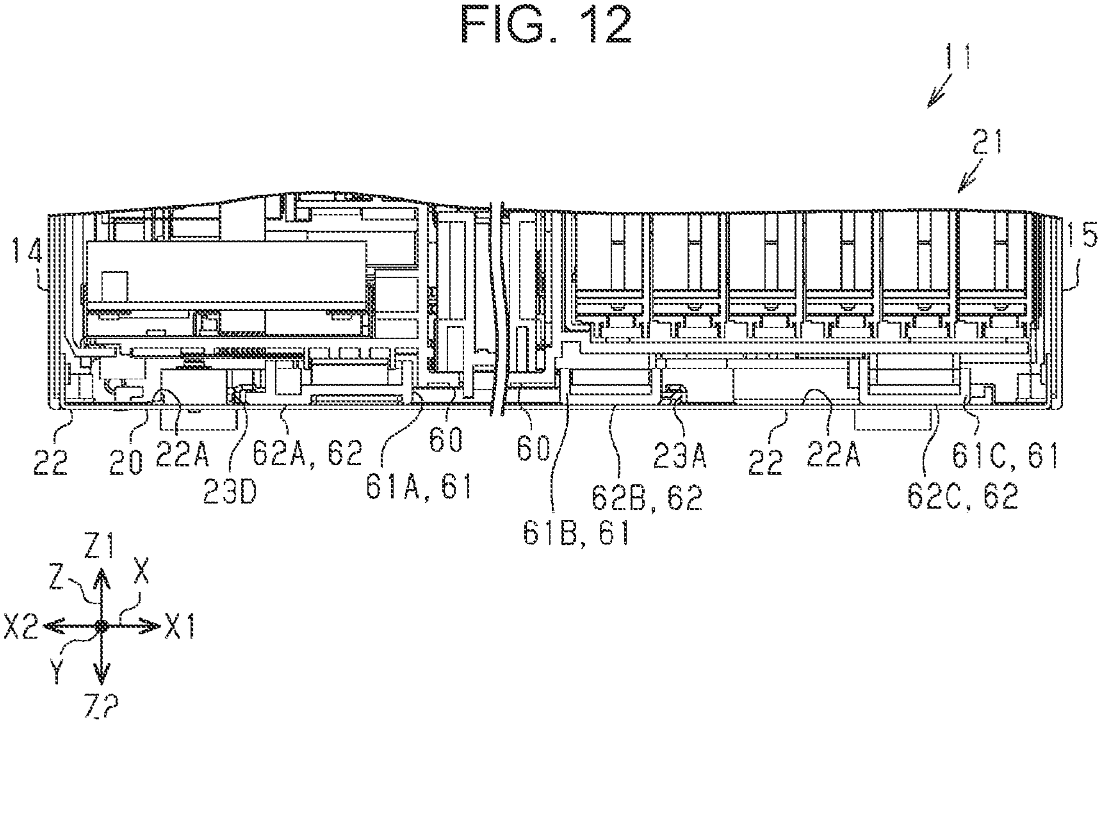
FIG. 12 is a cross-sectional view of the recording apparatus.
Figure 13:
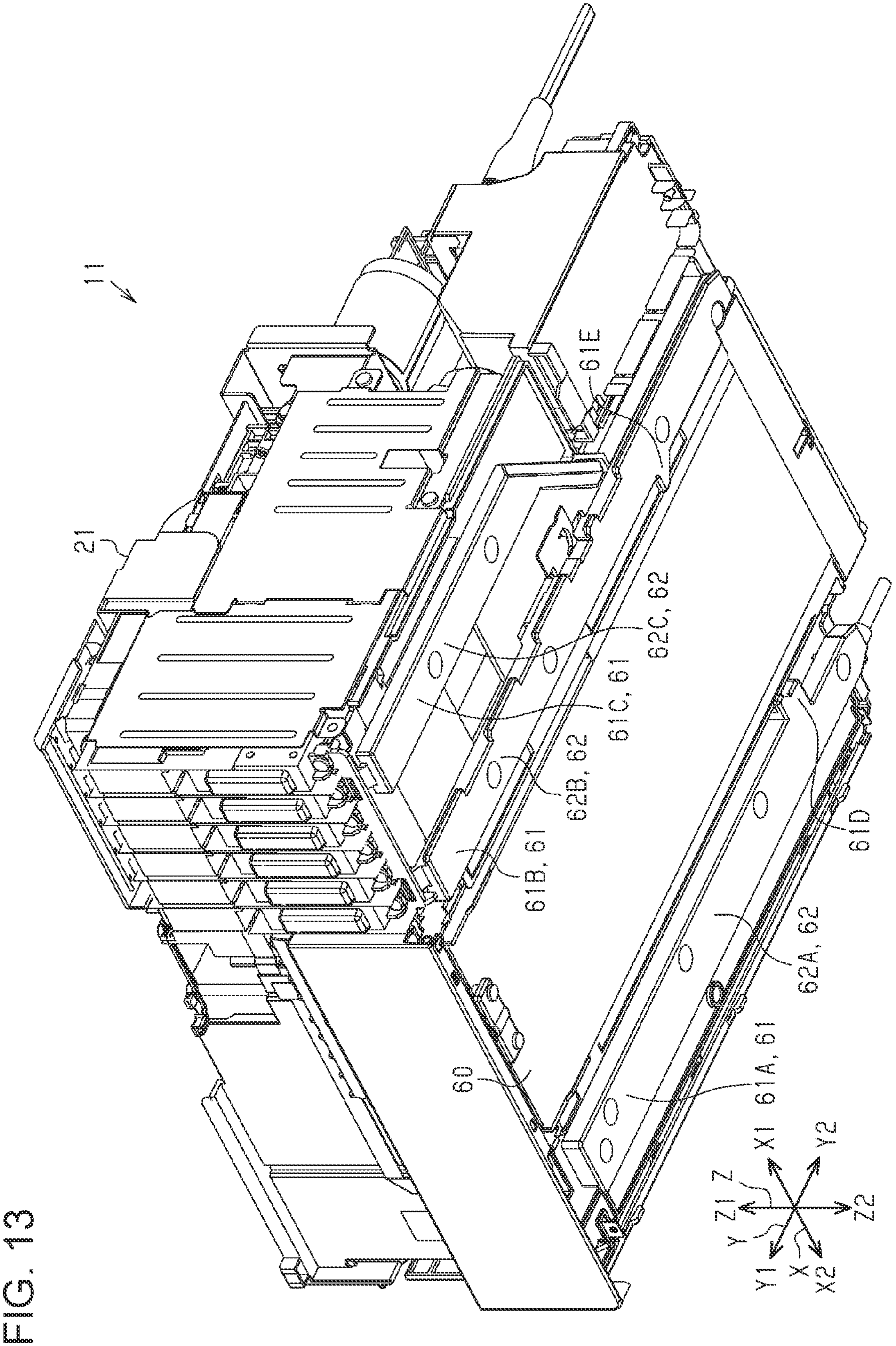
FIG. 13 is a perspective view of the recording apparatus.

As illustrated in FIGS. 12 and 13, the body 21 includes a body frame 60 and a slide rail 61. The body frame 60 and the slide rail 61 are formed separately from each other. The body frame 60 is mounted on the slide rail 61. The body frame 60 is not in contact with the upper surface 22A of the bottom plate 22 of the housing 20.

The body frame 60 supports various members that constitute the body 21. That is, various members that constitute the body 21 are mounted on the body frame 60. As a specific example of them, the liquid container portion 40, the waste-liquid-container attachment portion 45, the recording unit 48, the sheet feeding tray 54, and the transporting portion 55 are mounted on the body frame 60.

The slide rail 61 supports the body frame 60. The slide rail 61 may be made of resin. The slide rail 61 is configured to slide on the upper surface 22A of the bottom plate 22 of the housing 20. In particular, the slide rail 61 is configured to slide on the upper surface 22A of the bottom plate 22 without any contact of the body frame 60 with the upper surface 22A of the bottom plate 22.

More specifically, the slide rail 61 is configured to slide on the upper surface 22A of the bottom plate 22 of the housing 20 in a state in which a bottom surface 62 of the slide rail 61 is in contact with the upper surface 22A of the bottom plate 22 of the housing 20. That is, the body 21 is configured to be changed in position in the front-rear direction Y in a state of being supported over the upper surface 22A of the bottom plate 22 of the housing 20. The slide rail 61 is an example of a sliding portion configured to slide on the housing 20.

The slide rail 61 includes a plurality of slide rails 61A to 61C. Each of the plurality of slide rails 61A to 61C extends in the front-rear direction Y. The plurality of slide rails 61A to 61C may include the first slide rail 61A, the second slide rail 61B, and a third slide rail 61C. The second slide rail 61B and the third slide rail 61C are formed integrally with each other. Alternatively, the second slide rail 61B and the third slide rail 61C may be formed separately from each other. The first slide rail 61A is formed separately from the second slide rail 61B and the third slide rail 61C. Alternatively, the first slide rail 61A may be formed integrally with the second slide rail 61B and the third slide rail 61C.

The first slide rail 61A, the second slide rail 61B, and the third slide rail 61C are arranged in the width direction X. The plural slide rails 61A to 61C are arranged in the order of the first slide rail 61A, the second slide rail 61B, and the third slide rail 61C as viewed toward the first-width-directional side X1.

The first slide rail 61A is disposed at a position closer to the left side surface 14 of the recording apparatus 11 than to the right side surface 15 of the recording apparatus 11. The second slide rail 61B and the third slide rail 61C are disposed at a position closer to the right side surface 15 of the recording apparatus 11 than to the left side surface 14 of the recording apparatus 11.

In the body 21, the liquid container portion 40 is disposed at a position closer to the right side surface 15 of the recording apparatus 11 than to the left side surface 14 of the recording apparatus 11. The liquid container portion 40 is configured to contain the liquid. As described above, in consideration of the weight of the liquid contained in the liquid container portion 40, a larger number of slide rails are disposed at the position closer to the right side surface 15 of the recording apparatus 11 than at the position closer to the left side surface 14 of the recording apparatus 11. Moreover, the slide rail 61 is configured such that its area of contact with the upper surface 22A of the bottom plate 22 at the position closer to the right side surface 15 of the recording apparatus 11 is larger than at the position closer to the left side surface 14 of the recording apparatus 11.

The first slide rail 61A is configured to slide on the upper surface 22A of the bottom plate 22 of the housing 20 in a state in which a bottom surface 62A of the first slide rail 61A is in contact with the upper surface 22A of the bottom plate 22 of the housing 20. The second slide rail 61B is configured to slide on the upper surface 22A of the bottom plate 22 of the housing 20 in a state in which a bottom surface 62B of the second slide rail 61B is in contact with the upper surface 22A of the bottom plate 22 of the housing 20. The third slide rail 61C is configured to slide on the upper surface 22A of the bottom plate 22 of the housing 20 in a state in which a bottom surface 62C of the third slide rail 61C is in contact with the upper surface 22A of the bottom plate 22 of the housing 20.

The first slide rail 61A is located on the first-width-directional side X1 with respect to the fourth slide guide 23D. Similarly, the first slide rail 61A is located on the first-width-directional side X1 with respect to the fifth slide guide 23E and the sixth slide guide 23F. The first slide rail 61A is covered by the fourth slide guide 23D, the fifth slide guide 23E, and the sixth slide guide 23F from the second-width-directional side X2 and from above (Z1). A change in position of the first slide rail 61A in the second width direction X2 and upward (Z1) is restricted by the fourth slide guide 23D, the fifth slide guide 23E, and the sixth slide guide 23F.

The second slide rail 61B is located on the second-width-directional side X2 with respect to the first slide guide 23A. Similarly, the second slide rail 61B is located on the second-width-directional side X2 with respect to the second slide guide 23B and the third slide guide 23C. The second slide rail 61B is covered by the first slide guide 23A, the second slide guide 23B, and the third slide guide 23C from the first-width-directional side X1 and from above (Z1). A change in position of the second slide rail 61B in the first width direction X1 and upward (Z1) is restricted by the first slide guide 23A, the second slide guide 23B, and the third slide guide 23C.

The slide rail 61 includes a second change-in-position restricting portion 61D and a third change-in-position restricting portion 61E. The second change-in-position restricting portion 61D is provided on the first slide rail 61A. The second change-in-position restricting portion 61D protrudes in the first width direction X1 on the first slide rail 61A. The second change-in-position restricting portion 61D comes into contact with the first protruding portion 24A and thus restricts a change in position of the body 21 forward (Y1) when the body 21 is located at the second open position.

The third change-in-position restricting portion 61E is provided on the second slide rail 61B. The third change-in-position restricting portion 61E protrudes in the second width direction X2 on the second slide rail 61B. The third change-in-position restricting portion 61E comes into contact with the second protruding portion 24B and thus restricts a change in position of the body 21 forward (Y1) when the body 21 is located at the second open position.

Figure 14:
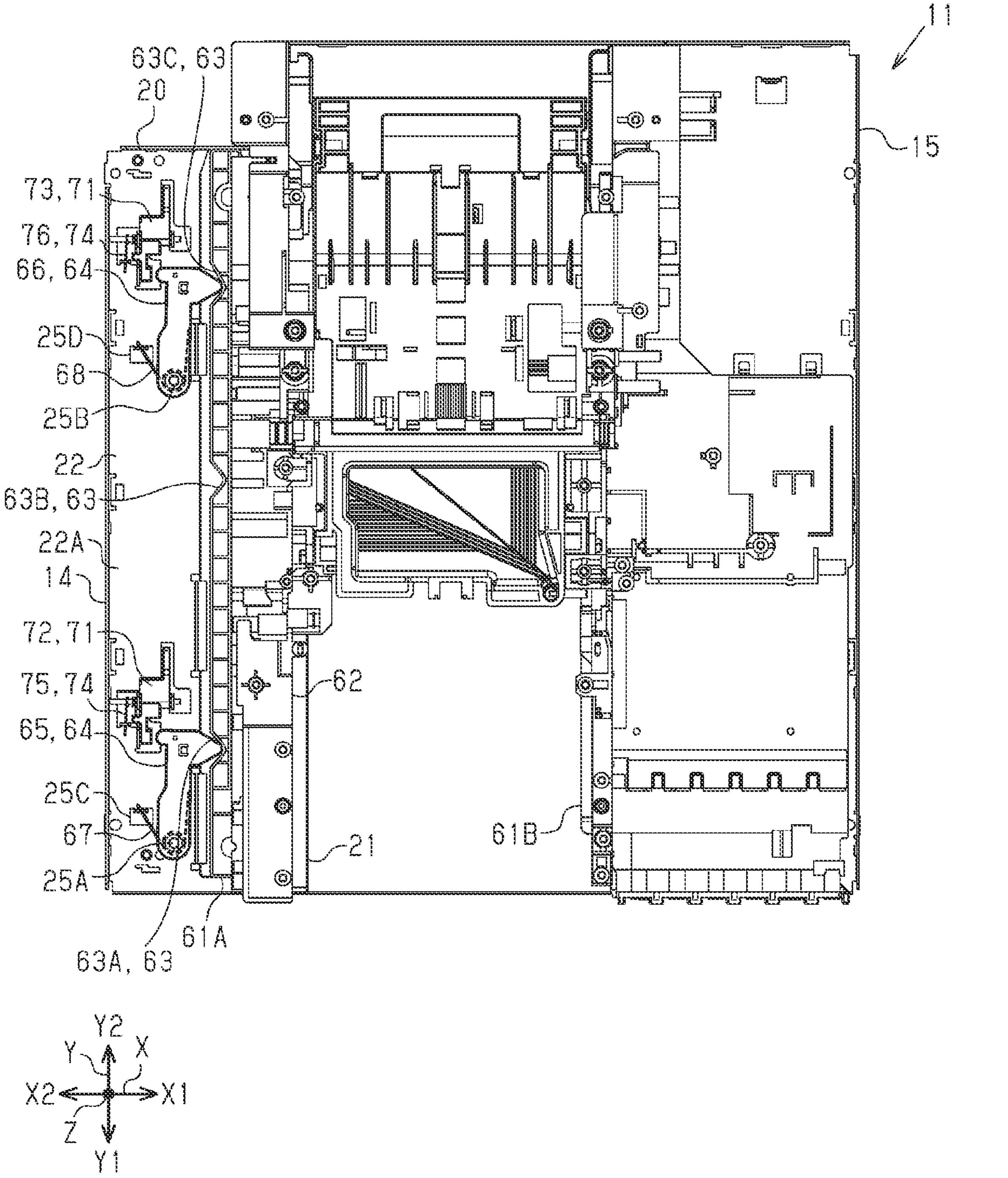
FIG. 14 is a plan view of the recording apparatus.

As illustrated in FIG. 14, the first slide rail 61A has a to-be-engaged portion 63. That is, the slide rail 61 has the to-be-engaged portion 63. In other words, the body 21 has the to-be-engaged portion 63. The to-be-engaged portion 63 is configured to be engaged with a holding portion 64 to be described later. The first slide rail 61A may include a plurality of to-be-engaged portions 63A to 63C. The plurality of to-be-engaged portions 63A to 63C may include a first to-be-engaged portion 63A, a second to-be-engaged portion 63B, and a third to-be-engaged portion 63C.

Each of the plurality of to-be-engaged portions 63A to 63C may be a recess formed in the left side surface, which is oriented in the second width direction X2, of the first slide rail 61A. Each of the plurality of to-be-engaged portions 63A to 63C has an inclined surface that is inclined toward the second-width-directional side X2 as it goes forward (Y1) from the center in the front-rear direction Y and an inclined surface that is inclined toward the second-width-directional side X2 as it goes rearward (Y2) from the center in the front-rear direction Y. The plural to-be-engaged portions 63A to 63C are provided at respective positions that are along the front-rear direction Y. The plural to-be-engaged portions 63A to 63C are arranged in the order of the first to-be-engaged portion 63A, the second to-be-engaged portion 63B, and the third to-be-engaged portion 63C as viewed toward the rear (Y2).

Structure of Holding Portion 64

The recording apparatus 11 includes the holding portion 64. The holding portion 64 is configured to hold the body 21 at a predetermined position with respect to the housing 20. The predetermined position includes the closed position, the first open position, and the second open position.

The recording apparatus 11 may include a plurality of holding portions 65 and 66. The plurality of holding portions 65 and 66 may include the first holding portion 65 and the second holding portion 66. The plural holding portions 65 and 66 are provided at respective positions that are along the front-rear direction Y. The first holding portion 65 is provided ahead of (Y1) the second holding portion 66.

The first holding portion 65 is supported rotatably on the first rotation shaft 25A. The second holding portion 66 is supported rotatably on the second rotation shaft 25B. Each of the plurality of holding portions 65 and 66 is provided on the second-width-directional side X2 with respect to the first slide rail 61A. Each of the plurality of holding portions 65 and 66 is provided at a position where the to-be-engaged portion 63A, 63B, 63C of the first slide rail 61A can be positioned to face it. The structure of the second holding portion 66 is the same as that of the first holding portion 65.

The recording apparatus 11 includes a plurality of holding urging portions 67 and 68 as an example of an urging portion. The plurality of holding urging portions 67 and 68 may include the first holding urging portion 67 and the second holding urging portion 68. The first holding urging portion 67 and the second holding urging portion 68 may be, for example, torsion coil springs. The first holding urging portion 67 is coiled around the first rotation shaft 25A and, in this state, urges the first holding portion 65. The second holding urging portion 68 is coiled around the second rotation shaft 25B and, in this state, urges the second holding portion 66. The structure of the second holding urging portion 68 is the same as that of the first holding urging portion 67.

Figure 15:
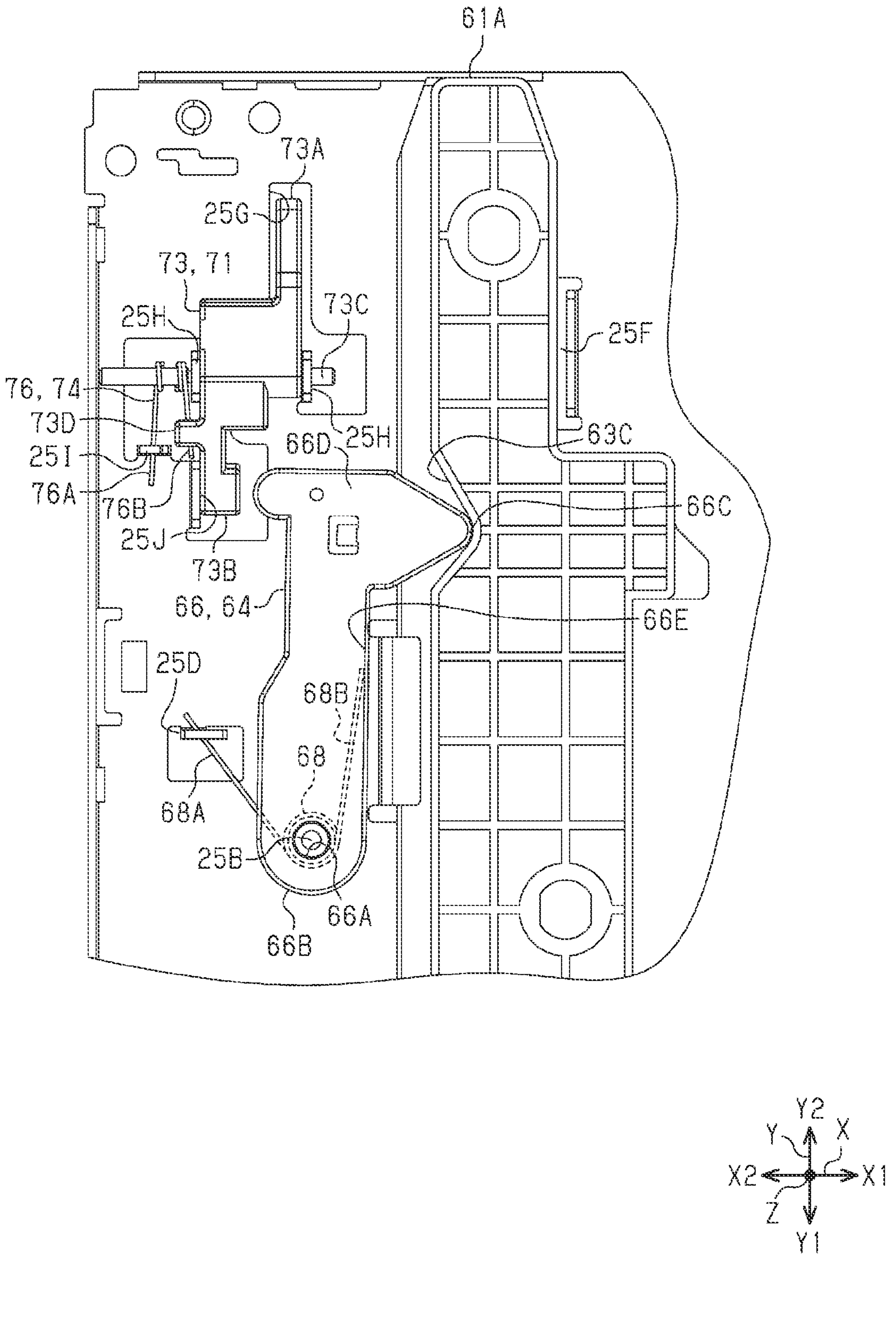
FIG. 15 is a plan view of a holding portion and a switching portion.

As illustrated in FIG. 15, the second holding portion 66 will be described as representative one of the plurality of holding portions 65 and 66, and the second holding urging portion 68 will be described as representative one of the plurality of holding urging portions 67 and 68. The second holding portion 66 has an opening 66A. The opening 66A is provided in a base end portion 66B of the second holding portion 66. The base end portion 66B is a front (Y1) end portion of the second holding portion 66. The second rotation shaft 25B can be inserted through the opening 66A. The second holding portion 66 is configured to rotate on the second rotation shaft 25B along a horizontal plane, with the second rotation shaft 25B inserted through the opening 66A.

The second holding portion 66 has an engaging portion 66C. The engaging portion 66C is provided on a head end portion 66D of the second holding portion 66. The head end portion 66D is a rear (Y2) end portion of the second holding portion 66. The engaging portion 66C is configured to be engaged with the third to-be-engaged portion 63C.

The second holding portion 66 has a right inner wall surface 66E. The right inner wall surface 66E is the inner wall surface of its sidewall located on the first-width-directional side X1. The right inner wall surface 66E receives an urging force applied by the second holding urging portion 68 to be described below.

The one end portion 68A of the second holding urging portion 68 is fixed to the second fixing portion 25D. The other end portion 68B of the second holding urging portion 68 is in contact with the right inner wall surface 66E of the second holding portion 66. Because of this structure, the second holding urging portion 68 urges the second holding portion 66 between the second fixing portion 25D and the right inner wall surface 66E. More specifically, the second holding urging portion 68 urges the second holding portion 66 clockwise as viewed from above (Z1). In this example, the second holding urging portion 68 urges the second holding portion 66 in the first width direction X1.

As described above, the second holding portion 66 is urged by the second holding urging portion 68 in the first width direction X1. In other words, due to the urging of the second holding portion 66 by the second holding urging portion 68, the engaging portion 66C of the second holding portion 66 is engaged with the third to-be-engaged portion 63C. The second holding portion 66 is configured to hold the first slide rail 61A by this engagement. That is, the second holding portion 66 is configured to hold the body 21. The position of the second holding portion 66 at which its engaging portion 66C is engaged with the third to-be-engaged portion 63C will be hereinafter referred to as "holding position".

In addition, in a state in which the engaging portion 66C of the second holding portion 66 urged by the second holding urging portion 68 is engaged with the third to-be-engaged portion 63C, the second holding portion 66 pushes the first slide rail 61A in the first width direction X1. Accordingly, the second holding portion 66 pushes the body 21 in the first width direction X1.

The first slide rail 61A is pushed by the second holding portion 66 in the first width direction X1. More specifically, when the first slide rail 61A is pushed in the first width direction X1 due to the force applied from the second holding portion 66, the pushing force is transmitted from the body frame 60 to the second slide rail 61B. Therefore, the second slide rail 61B is pushed against the first slide rail 61A, the second slide rail 61B, and the third slide rail 61C. In this case, the first slide rail 61A does not have to be in contact with the fourth slide guide 23D, the fifth slide guide 23E, and the sixth slide guide 23F in the width direction X. Depending on the flexure of the body frame 60, the first slide rail 61A could be pushed against the pressing surface 25F.

Figure 16:
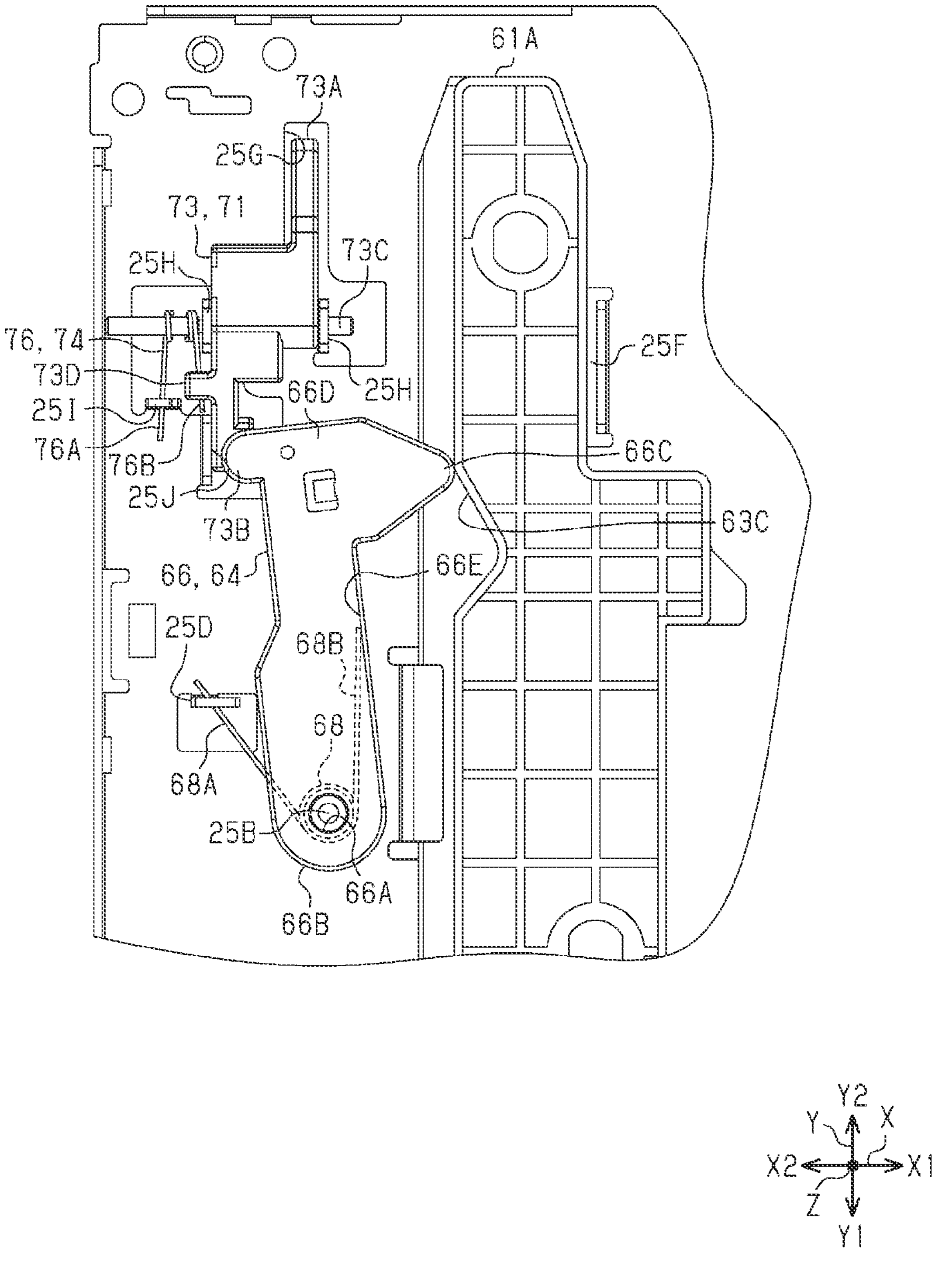
FIG. 16 is a plan view of the holding portion and the switching portion.

As illustrated in FIG. 16, when an operation for changing the position of the body 21 forward (Y1) is performed, the second holding portion 66 changes in position toward the second-width-directional side X2 against the urging force applied by the second holding urging portion 68. Therefore, in this state, the second holding portion 66 does not hold the body 21 and thus tolerates a change in position of the body 21 forward (Y1). The position of the second holding portion 66 at which its engaging portion 66C is not engaged with the third to-be-engaged portion 63C will be hereinafter referred to as "tolerating position".

The second holding portion 66 has been described as representative one of the plurality of holding portions 65 and 66, and the second holding urging portion 68 has been described as representative one of the plurality of holding urging portions 67 and 68; however, the first holding portion 65 and the first holding urging portion 67 also fulfill the same function as above. That is, the holding portion 64 is configured to change in position between the tolerating position and the holding position along the upper surface 22A of the bottom plate 22 by being urged by the holding urging portion 67, 68. In other words, the holding portion 64 is configured to change in position between the tolerating position and the holding position along a horizontal plane intersecting with the vertical direction Z by being urged by the holding urging portion 67, 68. The tolerating position corresponds to an example of "first position". The holding position corresponds to an example of "second position".

More specifically, as illustrated in FIG. 14, when the body 21 is located at the closed position, the first holding portion 65 is engaged with the first to-be-engaged portion 63A, and the second holding portion 66 is engaged with the third to-be-engaged portion 63C. Therefore, the body 21 is held by the first holding portion 65 and the second holding portion 66.

In this case, the first holding portion 65 pushes the first slide rail 61A in the first width direction X1 by being urged by the first holding urging portion 67. In addition, the first holding portion 65 pushes the second slide rail 61B toward the first slide guide 23A, the second slide guide 23B, and the third slide guide 23C by being urged by the first holding urging portion 67.

The second holding portion 66 pushes the first slide rail 61A in the first width direction X1 by being urged by the second holding urging portion 68. In addition, the second holding portion 66 pushes the second slide rail 61B toward the first slide guide 23A, the second slide guide 23B, and the third slide guide 23C by being urged by the second holding urging portion 68.

Figure 17:
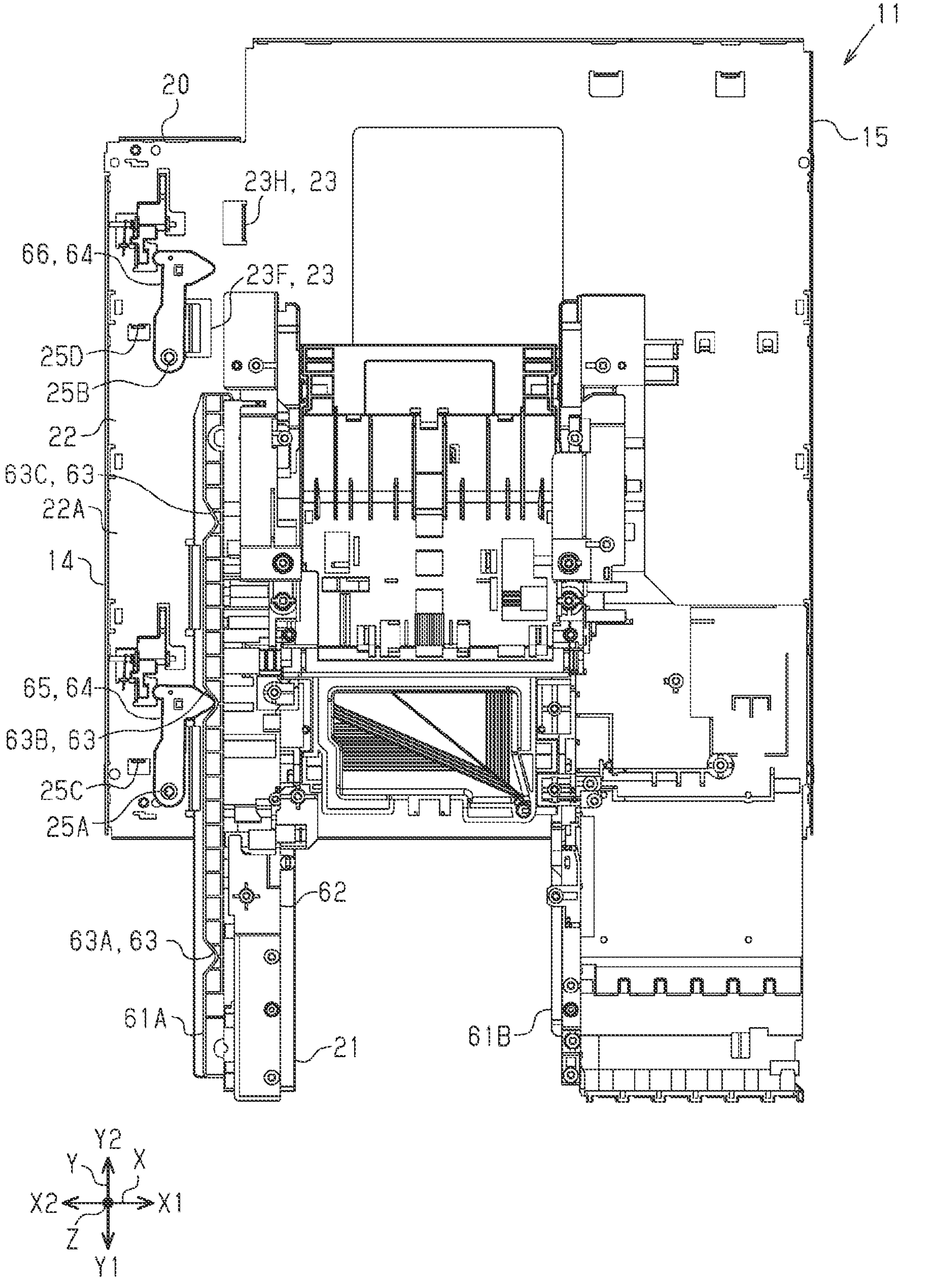
FIG. 17 is a plan view of the recording apparatus.

Meanwhile, as illustrated in FIG. 17, when the body 21 is located at the first open position, the first holding portion 65 is engaged with the second to-be-engaged portion 63B, and the second holding portion 66 is engaged with none of the plurality of to-be-engaged portions 63A to 63C.

Therefore, the body 21 is held by the first holding portion 65 without being held by the second holding portion 66.

In this case, the first holding portion 65 pushes the first slide rail 61A in the first width direction X1 by being urged by the first holding urging portion 67. In addition, the first holding portion 65 pushes the second slide rail 61B toward the first slide guide 23A and the second slide guide 23B by being urged by the first holding urging portion 67.

Figure 18:
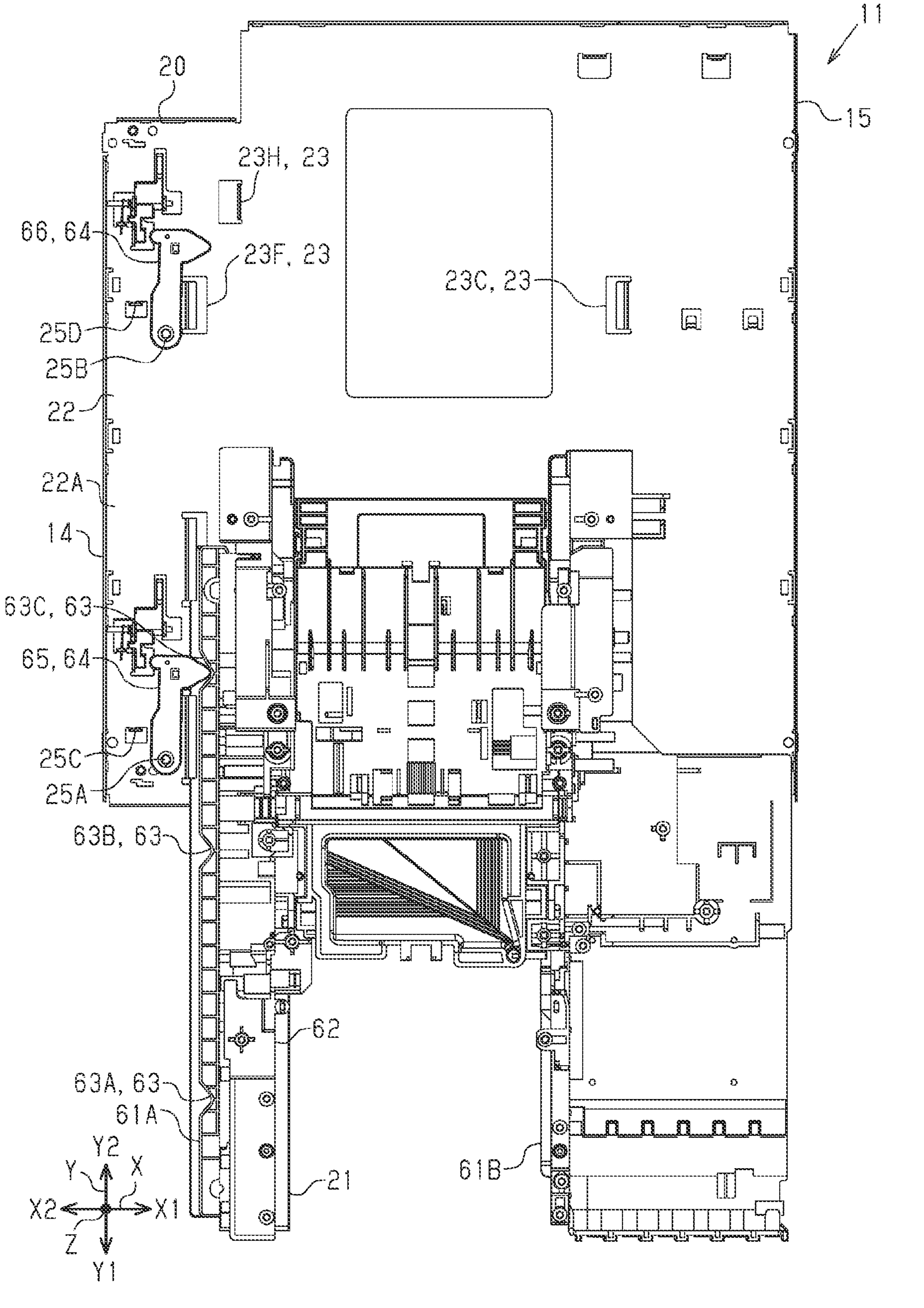
FIG. 18 is a plan view of the recording apparatus.

As illustrated in FIG. 18, when the body 21 is located at the second open position, the first holding portion 65 is engaged with the third to-be-engaged portion 63C, and the second holding portion 66 is engaged with none of the plurality of to-be-engaged portions 63A to 63C. Therefore, the body 21 is held by the first holding portion 65 without being held by the second holding portion 66.

In this case, the first holding portion 65 pushes the first slide rail 61A in the first width direction X1 by being urged by the first holding urging portion 67. In addition, the first holding portion 65 pushes the second slide rail 61B toward the first slide guide 23A by being urged by the first holding urging portion 67. As described above, the holding portion 64 is configured to hold the body 21 at the closed position, the first open position, and the second open position with respect to the housing 20.

Structure of Switching Portion 71 and Switching Urging Portion 74

As illustrated in FIG. 14, the recording apparatus 11 includes a switching portion 71. The switching portion 71 is provided on the housing 20. The switching portion 71 may include a plurality of switching portions 72 and 73. The plurality of switching portions 72 and 73 may include a first switching portion 72 and a second switching portion 73. That is, the recording apparatus 11 may include the first switching portion 72 and the second switching portion 73. The plural switching portions 72 and 73 are provided along the front-rear direction Y. The first switching portion 72 is provided ahead of (Y1) the second switching portion 73.

The switching portion 71 is located on the second-width-directional side X2 with respect to the holding portion 64. More specifically, the first switching portion 72 is located on the second-width-directional side X2 with respect to the first holding portion 65. The second switching portion 73 is located on the second-width-directional side X2 with respect to the second holding portion 66.

The switching portion 71 is configured to switch whether to restrict a change in position of the holding portion 64 from the holding position to the tolerating position or not. In other words, the switching portion 71 is configured to switch whether to restrict a change in position of the body 21 in the front-rear direction Y or not by switching whether to restrict a change in position of the holding portion 64 from the holding position to the tolerating position or not.

The recording apparatus 11 includes a switching urging portion 74. The switching urging portion 74 is provided on the housing 20. The switching urging portion 74 urges the switching portion 71. The switching urging portion 74 may be, for example, a torsion coil spring.

The switching urging portion 74 may include a plurality of switching urging portions 75 and 76. The plurality of switching urging portions 75 and 76 may include a first switching urging portion 75 and a second switching urging portion 76. That is, the recording apparatus 11 may include the first switching portion 75 and the second switching portion 76. The plural switching urging portions 75 and 76 are provided along the front-rear direction Y. The first switching urging portion 75 is provided ahead of (Y1) the second switching urging portion 76.

The switching urging portion 74 is located on the second-width-directional side X2 with respect to the switching portion 71. More specifically, the first switching urging portion 75 is located on the second-width-directional side X2 with respect to the first switching portion 72. The second switching urging portion 76 is located on the second-width-directional side X2 with respect to the second switching portion 73.

As illustrated in FIG. 15, the second switching portion 73 will be described as representative one of the plurality of switching portions 72 and 73, and the second switching urging portion 76 will be described as representative one of the plurality of switching urging portions 75 and 76. The second switching portion 73 extends in the front-rear direction Y. The second switching portion 73 has a first end portion 73A and a second end portion 73B. The first end portion 73A is a rear (Y2) end portion of the second switching portion 73. The second end portion 73B is a front (Y1) end portion of the second switching portion 73.

The second switching portion 73 includes a rotation shaft 73C. The rotation shaft 73C is located between the first end portion 73A and the second end portion 73B in the front-rear direction Y. The rotation shaft 73C extends in the width direction X. The second switching portion 73 includes an urging piece portion 73D. The urging piece portion 73D is provided between the second end portion 73B and the rotation shaft 73C in the front-rear direction Y. The urging piece portion 73D protrudes in the second width direction X2. The urging piece portion 73D receives an urging force from the second switching urging portion 76.

The second switching portion 73 is disposed such that it is accommodated inside a through hole 25G provided in the bottom plate 22. The through hole 25G extends through the bottom plate 22 in the vertical direction Z. The through hole 25G has a shape that resembles an outer shape of the second switching portion 73 and is larger than the outer shape of the second switching portion 73.

The second switching portion 73 is rotatably supported by a pair of switching supporting portions 25H provided on the bottom plate 22. More specifically, the rotation shaft 73C is rotatably supported by the pair of switching supporting portions 25H. The pair of switching supporting portions 25H are provided in such a way as to protrude upward (Z1) from the upper surface 22A of the bottom plate 22. Having this structure, the second switching portion 73 is configured to rotate on the rotation shaft 73C along a vertical plane that includes the front-rear direction Y.

The second switching urging portion 76 is coiled around the rotation shaft 73C of the second switching portion 73. A first end portion 76A of the second switching urging portion 76 is fixed to a third fixing portion 251. The third fixing portion 251 is provided on the bottom plate 22. A second end portion 76B of the second switching urging portion 76 is in contact with the urging piece portion 73D of the second switching portion 73. Having this structure, the second switching urging portion 76 urges the second end portion 73B of the second switching portion 73 upward (Z1). In other words, as viewed from the first-width-directional side X1, the second switching urging portion 76 urges the second switching portion 73 such that it is rotatable clockwise. As described here, the second switching portion 73 is configured to rotate along a vertical plane that includes the front-rear direction Y by being urged by the second switching urging portion 76.

Figure 19:
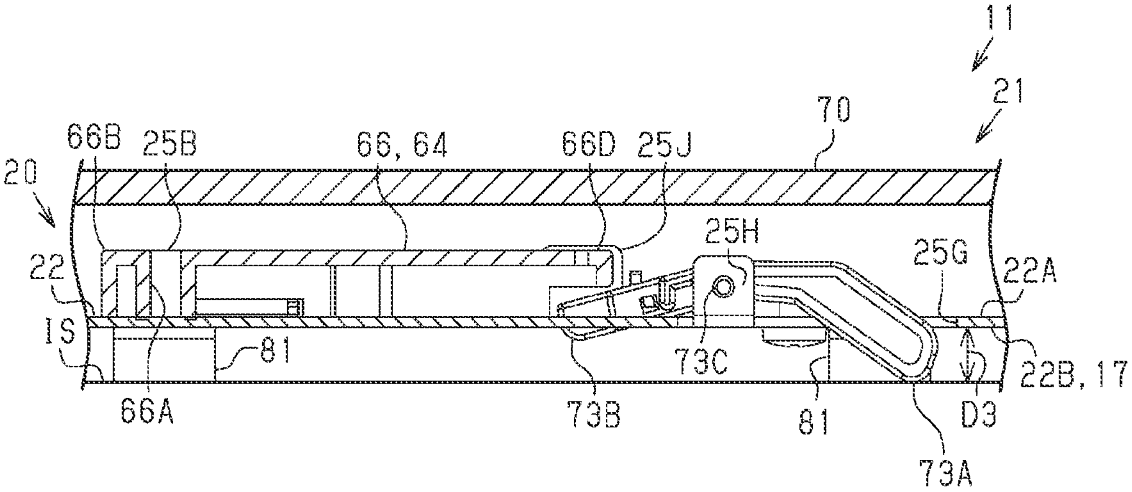
FIG. 19 is a cross-sectional view of the holding portion and the switching portion.

As illustrated in FIG. 19, the recording apparatus 11 includes a control board 70. The control board 70 is mounted in the body 21. The control board 70 includes a non-illustrated control unit. The control unit controls the recording apparatus 11. The control board 70 is disposed over (Z1) the upper surface 22A of the bottom plate 22. Therefore, there is a space between the upper surface 22A of the bottom plate 22 and the control board 70. The second holding portion 66 and the second switching portion 73 are housed inside the narrow space between the upper surface 22A of the bottom plate 22 and the control board 70.

The recording apparatus 11 may include a shock-absorbing portion 81. The shock-absorbing portion 81 is provided on the bottom surface 22B of the bottom plate 22. That is, the shock-absorbing portion 81 is provided on the bottom surface 16 of the recording apparatus 11. In other words, the shock-absorbing portion 81 is provided on the bottom surface of the housing 20.

The shock-absorbing portion 81 protrudes downward (Z2) from the bottom surface 22B of the bottom plate 22. Therefore, when the recording apparatus 11 is installed on the installation surface IS, the shock-absorbing portion 81 is in contact with the installation surface IS and supports the housing 20. The bottom surface 22B of the bottom plate 22 is not in contact with the installation surface IS. Therefore, there is a space between the bottom surface 22B of the bottom plate 22 and the installation surface IS.

When the recording apparatus 11 is installed on the installation surface IS, the second switching portion 73 is located at a first switching position. The first switching position is a position at which the first end portion 73A of the second switching portion 73 protrudes downward (Z2) from the bottom surface 22B of the bottom plate 22 by a third distance D3. The first switching position is a position at which the first end portion 73A of the second switching portion 73 is in contact with the installation surface IS when the recording apparatus 11 is installed on the installation surface IS. That is, the first switching position is a position at which the switching portion 71 is located in a state of being in contact with the installation surface IS when the housing 20 is installed on the installation surface IS.

The second end portion 73B is not in contact with the head end portion 66D of the second holding portion 66 when the second switching portion 73 is located at the first switching position. That is, the second switching portion 73 is not in contact with the second holding portion 66 when located at the first switching position.

As described here, the second switching portion 73 does not restrict a change in position of the second holding portion 66 from the holding position to the tolerating position when located at the first switching position. When the second holding portion 66 is located at the tolerating position, the engaging portion 66C is not engaged with the third to-be-engaged portion 63C; therefore, in this state, a change in position of the body 21 in the front-rear direction Y is not restricted. Therefore, the second switching portion 73 does not restrict a change in position of the body 21 in the front-rear direction Y when located at the first switching position.

Figure 20:
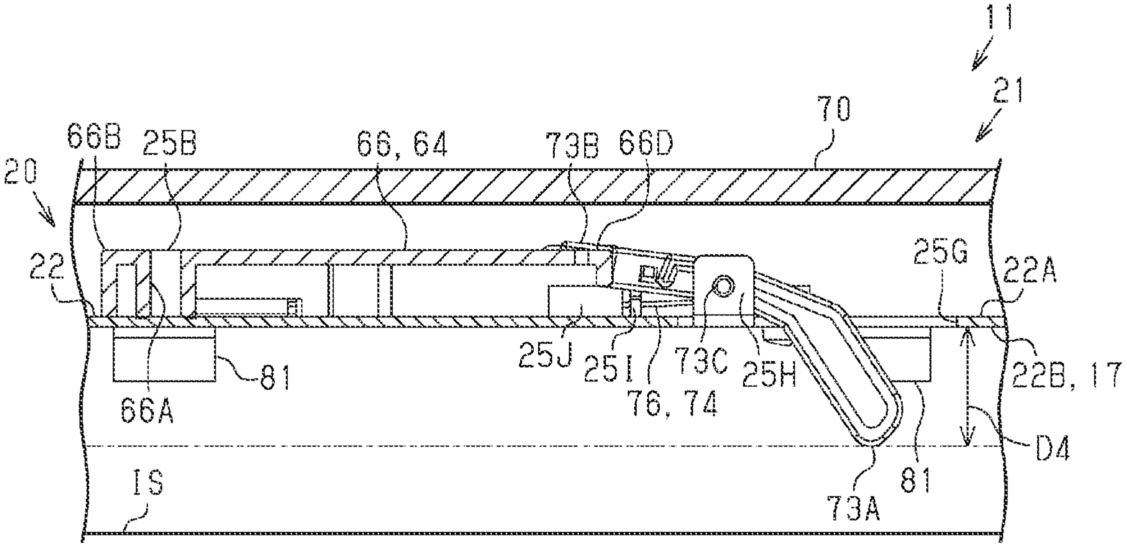
FIG. 20 is a cross-sectional view of the holding portion and the switching portion.

On the other hand, as illustrated in FIG. 20, when the recording apparatus 11 is lifted up from the installation surface IS, the second switching portion 73 is located at a second switching position. The second switching position is a position at which the first end portion 73A of the second switching portion 73 protrudes downward (Z2) from the bottom surface 22B of the bottom plate 22 by a fourth distance D4. The fourth distance D4 is longer than the third distance D3. As described here, the second switching position is a position at which the degree of protrusion from the bottom surface 22B of the bottom plate 22 is greater than at the first switching position. That is, the second switching position is a position at which the degree of protrusion from the bottom surface of the housing 20 is greater than at the first switching position. It can also be said that the second switching position is a position at which the switching portion 71 is located when the housing 20 is not installed on the installation surface IS. As described here, the switching portion 71 is configured to change in position between the first switching position and the second switching position.

The second end portion 73B is in contact with the head end portion 66D of the second holding portion 66 in the first width direction X1 when the second switching portion 73 is located at the second switching position. That is, the second switching portion 73 is in contact with the second holding portion 66 when located at the second switching position.

As described above, the second switching portion 73 restricts a change in position of the second holding portion 66 from the holding position to the tolerating position when located at the second switching position. When the second holding portion 66 is located at the holding position, the engaging portion 66C is engaged with the third to-be-engaged portion 63C; therefore, in this state, a change in position of the body 21 in the front-rear direction Y is restricted. More specifically, in a case where the body 21 is located at the closed position, the second holding portion 66, when located at the holding position in a state of being engaged with the third to-be-engaged portion 63C, restricts a change in position of the body 21 in the front-rear direction Y. Therefore, the second switching portion 73 restricts a change in position of the body 21 in the front-rear direction Y when located at the second switching position.

Figure 21:
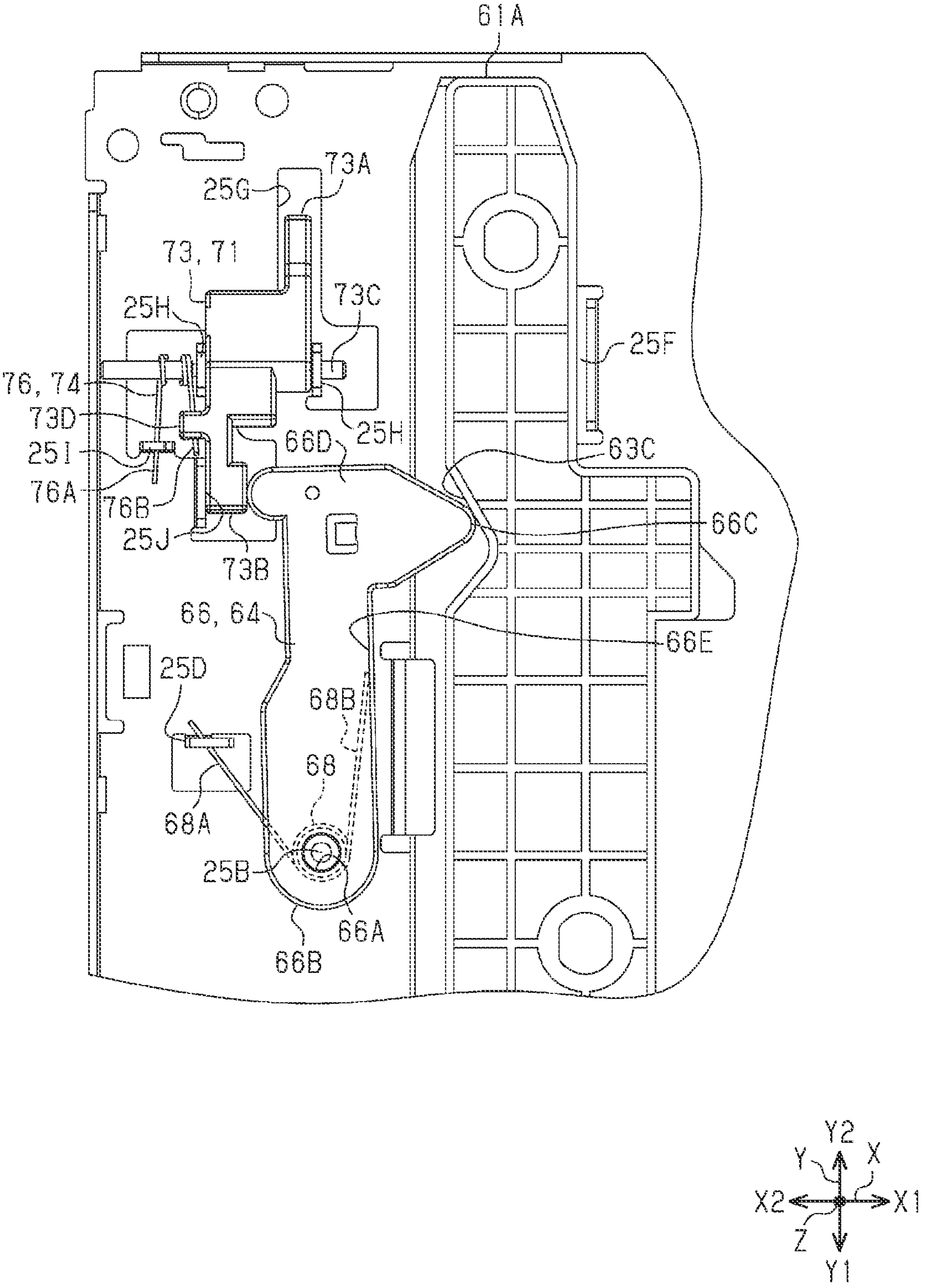
FIG. 21 is a plan view of the holding portion and the switching portion.

As illustrated in FIG. 21, the second end portion 73B is in contact with a third pressing surface 25J in the second width direction X2 when the second switching portion 73 is located at the second switching position. The third pressing surface 25J is provided on the upper surface 22A of the bottom plate 22. The third pressing surface 25J is provided in such a way as to protrude upward (Z1) from the upper surface 22A of the bottom plate 22. The third pressing surface 25J is a surface oriented in the first width direction X1.

The third pressing surface 25J is located on the second-width-directional side X2 with respect to the second end portion 73B when the second switching portion 73 is located at the second switching position. The third pressing surface 25J suppresses a change in position of the second switching portion 73 in the width direction X by being in contact with the second end portion 73B when the second switching portion 73 is located at the second switching position.

It can also be said that the first pressing surface 25E supports the first slide rail 61A from the first-width-directional side X1, and the third pressing surface 25J supports the first slide rail 61A from the second-width-directional side X2 via the second switching portion 73 and the second holding portion 66.

Though the second switching portion 73 has been described as representative one of the plurality of switching portions 72 and 73, the first switching portion 72 also fulfills the same function as above. Though the second switching urging portion 76 has been described as representative one of the plurality of switching urging portions 75 and 76, the first switching urging portion 75 also fulfills the same function as above. A case where the recording apparatus 11 is installed on the installation surface IS has been described as an example. However, also in a case where the recording apparatus 11 is installed on another recording apparatus or the like, the same can be said as in a case where the recording apparatus 11 is installed on the installation surface IS.

As described above, in a case where the body 21 is located at the closed position, similarly to the second holding portion 66, the first holding portion 65 restricts a change in position of the body 21 in the front-rear direction Y when located at the holding position in a state of being engaged with the first to-be-engaged portion 63A. In a case where the body 21 is located at the first open position, the first holding portion 65, when located at the holding position in a state of being engaged with the second to-be-engaged portion 63B, restricts a change in position of the body 21 in the front-rear direction Y. In a case where the body 21 is located at the second open position, the first holding portion 65, when located at the holding position in a state of being engaged with the third to-be-engaged portion 63C, restricts a change in position of the body 21 in the front-rear direction Y. The holding urging portion 67, 68 corresponds to an example of "first urging portion". The switching urging portion 74 corresponds to an example of "second urging portion".

Operation of First Embodiment

Operation of the first embodiment will now be explained.

In the recording system 10, an object to be stacked can be stacked on the top surface 17A of the first recording apparatus 11A. The object to be stacked thereon includes the second recording apparatus 11B. As described here, the second recording apparatus 11B can be stacked on the top surface 17A of the first recording apparatus 11A. In other words, the first recording apparatus 11A and the second recording apparatus 11B can be installed in the vertical direction Z.

In the recording apparatus 11, the body 21 is configured to be changed in position in the front-rear direction Y with respect to the housing 20. That is, it is possible to change the position of the body 21A of the first recording apparatus 11A in the front-rear direction Y without any need to remove the second recording apparatus 11B stacked on the top surface 17A of the first recording apparatus 11A, and it is also possible to change the position of the body 21B of the second recording apparatus 11B.

The front surface 12 of the recording apparatus 11 may be a face of the body 21, and the left side surface 14, the right side surface 15, and the top surface 17 of the recording apparatus 11 may be faces of the housing 20. The left side surface 14, the right side surface 15, and the top surface 17 of the recording apparatus 11 are comprised of the resin frame 27 and the metal plates 28A to 28C. The metal plates 28A to 28C are provided inside the resin frame 27. The use of the resin frame 27 reduces the weight of the housing 20 and makes it easier to apply processing thereto for improving its appearance. The use of the metal plates 28A to 28C ensures a sufficient strength of the housing 20 even when, for example, the second recording apparatus 11B is stacked on the top surface 17A of the first recording apparatus 11A.

The content amount visual confirmation portion 31, the operation panel 33, the notification lamp 36, and the open/close portion 37 are located on the front surface 12 of the recording apparatus 11. When the open/close portion 37 is opened, the exit port 38 is open forward (Y1), and the sheet ejection tray 37B and the grip portion 39 become usable from ahead (Y1) thereof. Gripping the grip portion 39 makes it easier to change the position of the body 21 in the front-rear direction Y.

The body 21 is housed inside the housing 20 when the body 21 is located at the closed position. The liquid container portion 40 is exposed when the body 21 is located at the first open position. More specifically, when the body 21 is located at the first open position, removing the cap 43 makes the liquid inlet 42 exposed. This makes it possible to pour a liquid into the container space 41. The waste-liquid-container attachment portion 45 is exposed when the body 21 is located at the first open position. This makes it possible to attach the waste liquid container 46 to, and detach the waste liquid container 46 from, the waste-liquid-container attachment portion 45.

The body 21 can be changed in position not only to the first open position but also to the second open position. A part of the transportation path 49 is exposed when the body 21 is located at the second open position. This makes it possible to troubleshoot a sheet-jam error at a part of the transportation path 49.

Work regarding the liquid container portion 40, the liquid inlet 42, the cap 43, the waste-liquid-container attachment portion 45, and a part of the transportation path 49 can also be performed from ahead (Y1) thereof. In particular, even when the second recording apparatus 11B is stacked on the top surface 17A of the first recording apparatus 11A, operability is not impaired. Moreover, even when the first recording apparatus 11A and the second recording apparatus 11B are installed side by side, operability is not impaired.

The body 21 has a structure in which the slide rail 61, on which the body frame 60 is mounted, is configured to slide on the upper surface 22A of the bottom plate 22 of the housing 20. Since the slide rail 61 slides on the upper surface 22A of the bottom plate 22 of the housing 20 without any contact of the body frame 60 with the upper surface 22A of the bottom plate 22 of the housing 20, the position of the body 21 can be changed in the front-rear direction Y smoothly.

The first slide rail 61A is held at a predetermined position by the holding portion 64. The predetermined position includes the closed position, the first open position, and the second open position. When the holding portion 64 is located at the holding position by being urged by the holding urging portion 67, 68, the holding portion 64 pushes the first slide rail 61A in the first width direction X1 in a state of being engaged with the to-be-engaged portion 63 of the first slide rail 61A. In this case, the holding portion 64 pushes the second slide rail 61B toward the first slide guide 23A, the second slide guide 23B, and the third slide guide 23C via the first slide rail 61A and the body frame 60. As described here, the body 21 is held at the predetermined position by being pushed in the first width direction X1 by the holding portion 64.

In particular, in order to enable the body 21 to be changed in position in the front-rear direction Y smoothly with respect to the housing 20, a gap is needed between the slide rail 61 and the slide guide 23. Even when such a gap is provided between the slide rail 61 and the slide guide 23, the holding portion 64 is able to hold the body 21 stably and suppress the vibration of the body 21.

When the user performs an operation for changing the position of the body 21 in the front-rear direction Y, the holding portion 64 receives a force toward the second-width-directional side X2 from the to-be-engaged portion 63 in accordance with the operation. Against the urging force applied by the holding urging portion 67, 68, the holding portion 64 changes in position from the holding position to the tolerating position, and therefore becomes disengaged from the to-be-engaged portion 63 of the first slide rail 61A. Since the holding portion 64 is not engaged with the to-be-engaged portion 63 of the first slide rail 61A as described here, the body 21 can be changed in position in the front-rear direction Y smoothly.

When the recording apparatus 11 is installed on the installation surface IS, the switching portion 71 is in contact with the installation surface IS and is located at the first switching position. When the switching portion 71 is located at the first switching position, a change in position of the holding portion 64 from the holding position to the tolerating position is not restricted. Therefore, a change in position of the body 21 in the front-rear direction Y is not restricted.

On the other hand, when the recording apparatus 11 is lifted up from the installation surface IS, the switching portion 71 is not in contact with the installation surface IS and is located at the second switching position by being urged by the switching urging portion 74. When the switching portion 71 is located at the second switching position, a change in position of the holding portion 64 from the holding position to the tolerating position is restricted. Therefore, a change in position of the body 21 in the front-rear direction Y is restricted.

The switching portion 71 is in contact with the third pressing surface 25J in the second width direction X2. This contact suppresses a change in position of the switching portion 71 in the width direction X. Therefore, the first slide rail 61A is held stably between the first pressing surface 25E, the second pressing surface 25F, and the third pressing surface 25J.

The holding portion 64 rotates along a horizontal plane by being urged by the holding urging portion 67, 68. The switching portion 71 rotates along a vertical plane that includes the front-rear direction Y by being urged by the switching urging portion 74. Combining the holding portion 64 and the switching portion 71, the directions of rotation of which are different from each other as described here, makes it possible to achieve a reduction in space. For example, as long as there is a slight space between the upper surface 22A of the bottom plate 22 and the control board 70, the holding portion 64 and the switching portion 71 can be housed in the space. Moreover, since the holding portion 64 and the switching portion 71 are located on the second-width-directional side X2 with respect to the first slide rail 61A, it is possible to minimize a space for power transmission. Therefore, it is possible to achieve a reduction in space.

Effects of First Embodiment

Effects of the first embodiment will now be explained.

(1) The switching portion 71 is configured to change in position between the first switching position and the second switching position, at which the switching portion 71 protrudes more from the bottom surface of the housing 20 than at the first switching position. The first switching position is a position at which the switching portion 71 is located in a state of being in contact with the installation surface IS when the housing 20 is installed on the installation surface IS. The second switching position is a position at which the switching portion 71 is located when the housing 20 is not installed on the installation surface IS. The switching portion 71 restricts a change in position of the body 21 in the front-rear direction Y when located at the second switching position. Therefore, the switching portion 71 is located at the second switching position when the housing 20 is not installed on the installation surface IS, for example, when the housing 20 is lifted up from the installation surface IS. In this case, a change in position of the body 21 in the front-rear direction Y is restricted. Therefore, even when the housing 20 is tilted due to the lifting up of the housing 20 from the installation surface IS, it is possible to prevent the user from changing the position of the body 21 with respect to the housing 20 unintentionally.

(2) The switching portion 71 does not restrict a change in position of the body 21 in the front-rear direction Y when located at the first switching position. Therefore, the switching portion 71 is located at the first switching position in a state of being in contact with the installation surface IS when the housing 20 is installed on the installation surface IS. In this case, a change in position of the body 21 in the front-rear direction Y is not restricted. Therefore, as long as the housing 20 is installed on the installation surface IS, the position of the body 21 can be changed in the front-rear direction Y; for example, the user does not have to perform a hold-releasing operation with an intent and, therefore, it is possible to enhance operability regarding a change in position of the body 21.

(3) The holding portion 64 is configured to rotate along a horizontal plane by being urged by the holding urging portion 67, 68. The switching portion 71 is configured to rotate along a vertical plane that includes the front-rear direction Y by being urged by the switching urging portion 74. Therefore, using both the holding portion 64 configured to rotate along a horizontal plane and the switching portion 71 configured to rotate along a vertical plane makes it possible to achieve a reduction in space and prevent the user from changing the position of the body 21 with respect to the housing 20 unintentionally.

(4) It could happen that the switching portion 71 fails to change in position to the second switching position due to unintended contact with the user when the housing 20 is not installed on the installation surface IS, for example, when the housing 20 is lifted up from the installation surface IS. In this respect, even when one of the plurality of switching portions 71 fails to change in position to the second switching position due to contact with the user, the other switching portion(s) changes in position to the second switching position. By this means, it is possible to restrict a change in position of the body 21 in the front-rear direction Y. Therefore, even when the housing 20 is tilted due to the lifting up of the housing 20 from the installation surface IS, it is possible to prevent the user from changing the position of the body 21 with respect to the housing 20 unintentionally.

(5) The body 21 includes the slide rail 61 configured to slide on the housing 20. The slide rail 61 has the to-be-engaged portions 63A to 63C configured to be engaged with the holding portion 64. The holding portion 64, when located at the holding position in a state of being engaged with the to-be-engaged portion 63A, 63B, or 63C, restricts a change in position of the body 21 in the front-rear direction Y. Therefore, the position of the body 21 can be changed in the front-rear direction Y smoothly. Therefore, it is possible to enhance operability. Moreover, it is possible to hold the body 21 at a predetermined position with a simple structure by providing the to-be-engaged portions 63A to 63C in the body 21.

(6) The first holding portion 65, when located at the holding position in a state of being engaged with the first to-be-engaged portion 63A, restricts a change in position of the body 21 in the front-rear direction Y in a state in which the body 21 is located at the closed position. The second holding portion 66, when located at the holding position in a state of being engaged with the third to-be-engaged portion 63C, restricts a change in position of the body 21 in the front-rear direction Y in a state in which the body 21 is located at the closed position. The first holding portion 65, when located at the holding position in a state of being engaged with the second to-be-engaged portion 63B, restricts a change in position of the body 21 in the front-rear direction Y in a state in which the body 21 is located at the first open position. The first holding portion 65, when located at the holding position in a state of being engaged with the third to-be-engaged portion 63C, restricts a change in position of the body 21 in the front-rear direction Y in a state in which the body 21 is located at the second open position.

Therefore, the position of the body 21 can be changed in the front-rear direction Y smoothly. Therefore, it is possible to enhance operability. Moreover, it is possible to hold the body 21 at a predetermined position with a simple structure by providing the to-be-engaged portions 63A to 63C in the body 21. Furthermore, it is possible to restrict a change in position of the body 21 in the front-rear direction Y when the body 21 is located at the closed position, when the body 21 is located at the first open position, and also when the body 21 is located at the second open position. Therefore, even when the housing 20 is tilted due to the lifting up of the housing 20 from the installation surface IS, it is possible to prevent the user from changing the position of the body 21 with respect to the housing 20 unintentionally.

(7) The body 21 is configured to be held at a predetermined position with respect to the housing 20. The predetermined position includes the closed position, the first open position, and the second open position. The closed position is a position at which the body 21 is housed inside the housing 20. The first open position is a position at which the body 21 protrudes from the housing 20 forward (Y1) by the first distance D1. The second open position is a position at which the body 21 protrudes from the housing 20 forward (Y1) by the second distance D2, which is longer than the first distance D1. The body 21 is configured to be changed in position in the front-rear direction Y between the closed position, the first open position, and the second open position. Therefore, it is possible to change the position of the body 21 in the front-rear direction Y between the closed position, the first open position, and the second open position, and it is possible to hold the body 21 at the closed position, the first open position, and the second open position with respect to the housing 20. Therefore, it is possible to make a selection as to the types of open positions at which the body 21 can be held and thus enhance operability regarding a change in position of the body 21 and the holding of the body 21.

(8) The housing 20 includes the first restricting portion 30. The first restricting portion 30 restricts a change in position of the body 21 forward (Y1) when the body 21 is located at the first open position. Therefore, it is possible to restrict a change in position of the body 21 forward (Y1) by the first restricting portion 30 when the body 21 is located at the first open position. Therefore, it is possible to enhance operability regarding a change in position of the body 21 and the holding of the body 21.

(9) The recording apparatus 11 includes the reversing portion 58 that reverses the direction in which the medium is transported along the transportation path 49. The reversing portion 58 is detachably attached to the body 21. A change in position of the body 21 forward (Y1) from the first open position is restricted due to the contact of the reversing portion 58 and the first restricting portion 30 when the reversing portion 58 is attached. Therefore, when the reversing portion 58 is attached to the body 21, it is possible to restrict a change in position of the body 21 forward (Y1) by the first restricting portion 30 when the body 21 is located at the first open position. Therefore, it is possible to enhance operability regarding a change in position of the body 21 and the holding of the body 21. That is, it is possible to prevent the user from changing the position of the body 21 to the second open position unintentionally.

(10) On the other hand, when the reversing portion 58 is not attached, a change in position of the body 21 forward (Y1) is not restricted by the first restricting portion 30 when the body 21 is located at the first open position. As described here, in order to change the position of the body 21 from the first open position to the second open position, there is a need to detach the reversing portion 58 from the body 21. Detaching the reversing portion 58 from the body 21 makes it possible to change the position of the body 21 from the first open position to the second open position in a state in which the medium cannot be transported and makes it possible to remove the medium on at least a part of the transportation path 49. Therefore, it is possible to enhance operability regarding the transportation path 49 of the medium. Moreover, detaching the reversing portion 58 from the body 21 makes it possible to reduce the weight of the body 21 and install the recording apparatus 11 stably even when the body 21 is changed in position to the second open position.

(11) The housing 20 includes the second restricting portion 24. The second restricting portion 24 restricts a change in position of the body 21 forward (Y1) when the body 21 is located at the second open position. Therefore, it is possible to restrict a change in position of the body 21 forward (Y1) by the second restricting portion 24 when the body 21 is located at the second open position. Therefore, it is possible to enhance operability regarding a change in position of the body 21 and the holding of the body 21.

(12) The holding portion 64 is urged in the first width direction X1 by the holding urging portion 67, 68. In order to enable the body 21 to be changed in position in the front-rear direction Y smoothly, there is a need to provide a gap in the width direction X. On the other hand, since the holding portion 64 is urged in the first width direction X1 by the holding urging portion 67, 68 so as to hold the body 21, it is possible to push the body 21 in the first width direction X1. Therefore, the holding portion 64 is able to hold the body 21 stably, thereby enhancing operability regarding the holding of the body 21. Moreover, it is possible to suppress the vibration of the body 21. Therefore, though the body 21 is configured to be changed in position in the front-rear direction Y, it is possible to enhance the quality of recording performed by the recording unit 48 mounted in the body 21.

(13) The housing 20 includes the slide guide 23. The slide guide 23 restricts a change in position of the slide rail 61 in the width direction X. Therefore, it is possible to restrict, by the slide guide 23, a change in position in the width direction X of the slide rail 61 configured to slide on the housing 20. Therefore, the holding portion 64 is able to hold the body 21 stably, thereby enhancing operability regarding the holding of the body 21. Moreover, it is possible to prevent the body 21 from coming off the housing 20.

(14) The holding portion 64 pushes the slide rail 61 against the slide guides 23A to 23C in the first width direction X1 by being urged by the holding urging portion 67, 68. Therefore, it is possible to push the slide rail 61 against the slide guides 23A to 23C in the first width direction X1. Therefore, the holding portion 64 is able to hold the body 21 stably, thereby enhancing operability regarding the holding of the body 21.

(15) The first holding portion 65 and the second holding portion 66 are provided at positions that are along the front-rear direction Y. When the body 21 is located at the closed position, the body 21 is held by the first holding portion 65 and the second holding portion 66. When the body 21 is located at the first open position and when the body 21 is located at the second open position, the body 21 is held by the first holding portion 65 without being held by the second holding portion 66. Therefore, it is possible to hold the body 21 more stably when the body 21 is in a closed state, as compared with when the body 21 is in a first open state and when the body 21 is in a second open state. Therefore, it is possible to enhance operability regarding a change in position of the body 21 and the holding of the body 21.

(16) The first to-be-engaged portion 63A, the second to-be-engaged portion 63B, and the third to-be-engaged portion 63C are provided at positions that are along the front-rear direction Y and are configured to be engaged with the holding portion 64. When the body 21 is located at the closed position, the body 21 is held by the first holding portion 65 and the second holding portion 66 in a state in which the first holding portion 65 is engaged with the first to-be-engaged portion 63A and in which the second holding portion 66 is engaged with the third to-be-engaged portion 63C. When the body 21 is located at the first open position, the body 21 is held by the first holding portion 65 without being held by the second holding portion 66 in a state in which the first holding portion 65 is engaged with the second to-be-engaged portion 63B and in which the second holding portion 66 is not engaged with the first to-be-engaged portion 63A nor with the third to-be-engaged portion 63C. When the body 21 is located at the second open position, the body 21 is held by the first holding portion 65 without being held by the second holding portion 66 in a state in which the first holding portion 65 is engaged with the third to-be-engaged portion 63C and in which the second holding portion 66 is not engaged with the first to-be-engaged portion 63A nor with the second to-be-engaged portion 63B. Therefore, it is possible to hold the body 21 more stably when the body 21 is in a closed state, as compared with when the body 21 is in a first open state and when the body 21 is in a second open state. Therefore, it is possible to enhance operability regarding a change in position of the body 21 and the holding of the body 21. Moreover, it is possible to hold the body 21 at a predetermined position with a simple structure by providing the to-be-engaged portion 63 in the body 21. Furthermore, for the third to-be-engaged portion 63C, engagement by the holding portion 64 can be used both when the body 21 is located at the closed position and when the body 21 is located at the second open position. This makes it possible to hold the body 21 at a predetermined position with a simple structure, achieve a reduction in space, and make the distance between the closed position and the second open position longer.

(17) At least a part of the transportation path 49 is exposed when the body 21 is located at the second open position. Therefore, by changing the position of the body 21 from the closed position to the second open position in the front-rear direction Y, it is possible to make at least a part of the transportation path 49 mounted in the body 21 exposed. As described here, by changing the position of the body 21 from the closed position to the second open position in the front-rear direction Y, it is possible to make at least a part of the transportation path 49 exposed for removing the medium and thus enhance operability.

(18) The liquid inlet 42 is exposed when the body 21 is located at an open position. Therefore, by changing the position of the body 21 from the closed position to the open position in the front-rear direction Y, it is possible to make the liquid inlet 42 mounted in the body 21 exposed. As described here, by changing the position of the body 21 from the closed position to the open position in the front-rear direction Y, it is possible to make the liquid inlet 42 exposed for pouring the liquid through it and thus enhance operability.

(19) The liquid container portion 40 and the exit port 38 are provided next to each other inside the same forward-oriented (Y1) face of the body 21. This enhances operability regarding the liquid container portion 40 and the exit port 38.

(20) The waste liquid container 46 can be attached to the waste-liquid-container attachment portion 45. The liquid discharged as a waste liquid from the recording unit 48 can be collected into the waste liquid container 46. The waste-liquid-container attachment portion 45 is mounted in the body 21. The waste-liquid-container attachment portion 45 is exposed when the body 21 is located at an open position. Therefore, by changing the position of the body 21 from the closed position to the open position in the front-rear direction Y, it is possible to make the waste-liquid-container attachment portion 45 mounted in the body 21 exposed. As described here, by changing the position of the body 21 from the closed position to the open position in the front-rear direction Y, it is possible to make the waste-liquid-container attachment portion 45 exposed for attaching the waste liquid container 46 thereto and detaching the waste liquid container 46 therefrom and thus enhance operability regarding the waste-liquid-container attachment portion 45.

(21) The exit port 38 is provided inside the forward-oriented (Y1) face of the body 21 as an opening oriented forward (Y1). The waste-liquid-container attachment portion 45 is provided over (Z1) the exit port 38. Therefore, the user is able to perform work regarding the waste-liquid-container attachment portion 45 and the exit port 38 from ahead of the same forward-oriented (Y1) face of the body 21. In this way, it is possible to enhance operability regarding the waste-liquid-container attachment portion 45 and the exit port 38.

(22) The body 21 includes the grip portion 39, which the user can grip when changing the position of the body 21. The grip portion 39 is provided inside the forward-oriented (Y1) face of the body 21 at a position where it can be gripped from ahead thereof (Y1). Therefore, the grip portion 39 can be gripped from ahead of the forward-oriented (Y1) face of the body 21. With this structure, by gripping the grip portion 39, it is possible to change the position of the body 21 smoothly. Therefore, it is possible to enhance operability regarding a change in position of the body 21.

(23) The exit port 38 is provided inside the forward-oriented (Y1) face of the body 21 as an opening oriented forward (Y1). The grip portion 39 is provided over (Z1) the exit port 38. Therefore, the grip portion 39 and the exit port 38 are provided next to each other inside the same forward-oriented (Y1) face of the body 21. In this way, it is possible to enhance operability regarding the grip portion 39 and the exit port 38.

(24) The housing 20 has a left side surface, a right side surface, and a top surface oriented in directions intersecting with the front-rear direction Y. The left side surface, the right side surface, and the top surface are faces of the frame 27 made of resin. Therefore, the use of the resin frame 27 reduces the weight of the housing 20 and makes it easier to apply processing thereto for improving its appearance.

(25) On the other hand, the metal plates 28A to 28C are provided inside the resin frame 27. Therefore, though the body 21 is configured to be changed in position in the front-rear direction Y with respect to the housing 20, it is possible to enhance the rigidity of the housing 20 and suppress the tilt of the housing 20 itself due to a change in position of the body 21 to an open position.

(26) The housing 20 has a top surface that is oriented upward (Z1). The top surface includes a flat surface on which an object to be stacked can be stacked. Therefore, even when an object to be stacked is stacked on the top surface, it is possible to change the position of the body 21 in the front-rear direction Y. Therefore, it is possible to enhance operability regarding a change in position of the body 21.

(27) The content amount visual confirmation portion 31 and the operation panel 33 are mounted on the body 21. The body 21 has the first area 18 and the second area 19 on its forward-oriented (Y1) face. The first area 18 and the second area 19 are split areas adjacent to each other in the width direction X. The content amount visual confirmation portion 31 is provided in the first area 18. The operation panel 33 is provided in the second area 19. The first area 18 is an area that has a black-based color. The second area 19 is an area that has a white-based color. This makes it easier to visually recognize the first area 18, in which the content amount visual confirmation portion 31 is provided, and the second area 19, in which the operation panel 33 is provided, on the same forward-oriented (Y1) face of the body 21. Therefore, it is possible to enhance operability regarding the content amount visual confirmation portion 31 and the operation panel 33.

(28) The second recording apparatus 11B can be stacked on the top surface 17A of the first recording apparatus 11A. Therefore, when the first recording apparatus 11A and the second recording apparatus 11B are installed, it is possible to achieve a reduction in space in the horizontal direction and to enhance operability regarding the first recording apparatus 11A and the second recording apparatus 11B.

(29) When the second recording apparatus 11B is stacked on the top surface 17A of the first recording apparatus 11A, the front surface 12A of the first recording apparatus 11A and the front surface 12B of the second recording apparatus 11B are included in the same plane. Therefore, even when the second recording apparatus 11B is stacked on the top surface 17A of the first recording apparatus 11A, it is possible to enhance operability on the front surface 12A of the first recording apparatus 11A and the front surface 12B of the second recording apparatus 11B, which are included in the same plane.

Second Embodiment

Next, the second embodiment will now be explained. In the second embodiment, a container attachment portion 88 is mounted in the body 21 in place of the liquid container portion 40. In the description below, the same reference signs will be assigned to components, etc. that are the same as those having already been explained in the foregoing embodiment, and the same explanation will not be given for them, or the explanation about them will be simplified.

Figure 22:
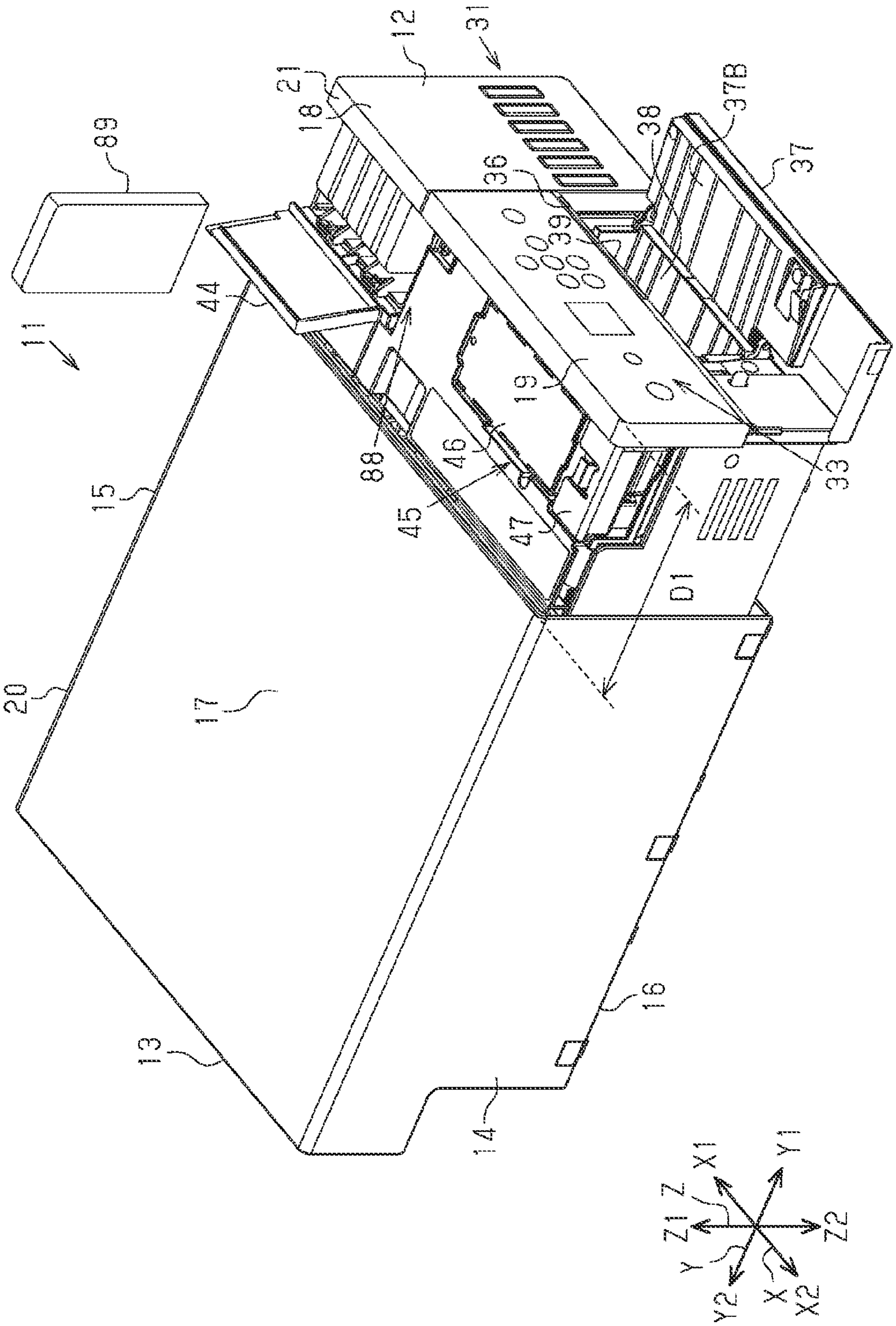
FIG. 22 is a perspective view of a recording apparatus.

As illustrated in FIG. 22, the recording apparatus 11 includes the container attachment portion 88. The container attachment portion 88 is mounted in the body 21. A liquid container 89 can be attached to the container attachment portion 88. The liquid container 89 is configured to contain a liquid to be used for performing recording on a medium. The liquid container 89 may be, for example, an ink cartridge. A plurality of liquid containers 89 corresponding to the liquid of the respective colors may be attachable to the container attachment portion 88. The container attachment portion 88 is provided next to the exit port 38 in the width direction X. The container attachment portion 88 is provided next to the waste-liquid-container attachment portion 45 in the width direction X.

The container attachment portion 88 is not exposed to the outside from the housing 20 when the body 21 is located at the closed position. On the other hand, the container attachment portion 88 is exposed to the outside from the housing 20 when the body 21 is located at the first open position. As described here, the container attachment portion 88 is exposed to the outside from the housing 20 when the body 21 is located at the first open position. This makes it possible to attach the liquid container 89 to, and detach the liquid container 89 from, the container attachment portion 88. Moreover, also when the body 21 is located at the second open position, the same can be said about the container attachment portion 88 as when the body 21 is located at the first open position. That is, the container attachment portion 88 is exposed to the outside from the housing 20 when the body 21 is located at an open position. The waste-liquid-container attachment portion 88 corresponds to an example of "first attachment portion".

Effects of Second Embodiment

Effects of the second embodiment will now be explained.

(30) By changing the position of the body 21 from the closed position to the first open position in the front-rear direction Y, it is possible to make the container attachment portion 88 mounted in the body 21 exposed. As described here, by changing the position of the body 21 from the closed position to the first open position in the front-rear direction Y, it is possible to make the container attachment portion 88 exposed for attaching the liquid container 89 thereto and detaching the liquid container 89 therefrom and thus enhance operability.

(31) The container attachment portion 88 and the exit port 38 are provided next to each other inside the same forward-oriented (Y1) face of the body 21. As described here, by changing the position of the body 21 from the closed position to the first open position in the front-rear direction Y, it is possible to enhance operability regarding the container attachment portion 88 and the exit port 38.

Modification Examples

The foregoing embodiments may be modified as described below. The foregoing embodiments and the following modification examples may be combined with one another as long as they are not technically contradictory to one another.

For example, the recording apparatus 11 does not necessarily have to include the shock-absorbing portion 81 provided on the bottom surface 22B of the bottom plate 22.

The first switching position may be any position at which the switching portion 71 is located in a state of being in contact with the installation surface IS when the housing 20 is installed on the installation surface IS. For example, the first switching position may be a position at which the switching portion 71 does not protrude from the bottom surface 22B of the bottom plate 22.

For example, the recording apparatus 11 may include four or more to-be-engaged portions as the plurality of to-be-engaged portions 63. For example, the recording apparatus 11 may be configured to be not equipped with at least any one of the plurality of to-be-engaged portions 63A to 63C.

For example, the recording apparatus 11 may include three or more switching portions as the plurality of switching portions 71. For example, either the first switching portion 72 or the second switching portion 73 as one of the switching portions 71 of the recording apparatus 11 may be omitted. In these cases, the recording apparatus 11 may include the holding portion(s) 64 the number of which is the same as the number of the switching portion(s) 71.

For example, as long as the recording apparatus 11 includes the switching portion configured to switch whether to restrict a change in position of the body 21 in the front-rear direction Y or not, the recording apparatus 11 does not necessarily have to include the holding portion 64 separately from the switching portion.

Though the holding portion 64 is located on the second-width-directional side X2 with respect to the first slide rail 61A in the foregoing embodiments, the scope of the present disclosure is not limited thereto. For example, the holding portion 64 may be located on the first-width-directional side X1 with respect to the first slide rail 61A. For example, the holding portion 64 may be located on the first-width-directional side X1 with respect to the second slide rail 61B. For example, the holding portion 64 may be located on the second-width-directional side X2 with respect to the second slide rail 61B. For example, it may be a combination of them. It is possible to suppress the vibration of the body 21 more effectively by the holding portion 64 if provided on only one side in the width direction X with respect to the slide rail 61.

Though the body 21 is held at two points by the holding portion 64 when the body 21 is located at the closed position in the foregoing embodiments, the scope of the present disclosure is not limited thereto. For example, the body 21 may be held at three or more points by the holding portion 64 in this case. The body 21 may be held at one point by the holding portion 64 in this case.

Though the body 21 is held at one point by the holding portion 64 when the body 21 is located at the first open position in the foregoing embodiments, the scope of the present disclosure is not limited thereto. For example, the body 21 may be held at two or more points by the holding portion 64 in this case.

Though the body 21 is held at one point by the holding portion 64 when the body 21 is located at the second open position in the foregoing embodiments, the scope of the present disclosure is not limited thereto. For example, the body 21 may be held at two or more points by the holding portion 64 in this case.

As long as the holding portion 64 is engaged with the to-be-engaged portion 63, for example, the to-be-engaged portion 63 may have a convex shape, and the holding portion 64 may have a concave shape.

The holding portion 64 may change in position from the holding position to the tolerating position in accordance with the gripping of the grip portion 39 by the user. For example, the holding portion 64 may be allowed to change in position from the holding position to the tolerating position in accordance with the gripping of the grip portion 39 by the user.

For example, the first restricting portion 30 may restrict a change in position of the body 21 forward (Y1) from the first open position by contact with any other member of the body 21, in place of the reversing portion 58. In this case, whether or not to contact with the other member of the body 21 may be switchable based on a user operation.

For example, as long as refilling, etc. of the liquid container portion 40 can be performed from ahead of the front surface 12 of the recording apparatus 11, there may be some positional deviation in the front-rear direction Y. That is, positions that are next to each other in the width direction X mean that there may be some positional deviation in the front-rear direction Y as long as the deviation is small enough so that refilling, etc. can be performed from ahead of the front surface 12 of the recording apparatus 11. For example, the liquid container portion 40 may be provided next to at least any one of the exit port 38, the grip portion 39, and the waste-liquid-container attachment portion 45 in the width direction X. For example, the liquid container portion 40 does not necessarily have to be provided next to the exit port 38, the grip portion 39, and the waste-liquid-container attachment portion 45 in the width direction X. For example, the liquid container portion 40 may be provided over (Z1) the exit port 38.

For example, as long as container replacement, etc. of the container attachment portion 88 can be performed from ahead of the front surface 12 of the recording apparatus 11, there may be some positional deviation in the front-rear direction Y. For example, the container attachment portion 88 may be provided next to at least any one of the exit port 38, the grip portion 39, and the waste-liquid-container attachment portion 45 in the width direction X. For example, the container attachment portion 88 does not necessarily have to be provided next to the exit port 38, the grip portion 39, and the waste-liquid-container attachment portion 45 in the width direction X. For example, the container attachment portion 88 may be provided over (Z1) the exit port 38.

For example, the waste-liquid-container attachment portion 45 may be provided next to the exit port 38 and the grip portion 39 in the width direction X. For example, the waste-liquid-container attachment portion 45 may be provided next to either the exit port 38 or the grip portion 39, or both the exit port 38 and the grip portion 39 in the width direction X.

For example, the grip portion 39 may be provided under (Z2) the exit port 38. For example, the grip portion 39 may be provided next to either the exit port 38 or the waste-liquid-container attachment portion 45, or both the exit port 38 and the waste-liquid-container attachment portion 45 in the width direction X.

For example, the body 21 may be configured to be not equipped with at least any one of the content amount visual confirmation portion 31, the operation panel 33, the sheet ejection tray 37B, the exit port 38, the grip portion 39, the liquid container portion 40, the waste-liquid-container attachment portion 45, the supporting portion 53, the sheet feeding tray 54, the transporting portion 55, and the container attachment portion 88 of the body 21.

At least any one of the left side surface 14, the right side surface 15, and the top surface 17 may lack a metal plate.

Though a serial-type printer is adopted as the recording apparatus 11 in the foregoing embodiments, the scope of the present disclosure is not limited thereto. For example, a lateral-type printer or a line-type printer may be adopted as the recording apparatus 11. The lateral-type printer is a printer whose carriage is movable in two directions, namely, a main-scan direction and a sub-scan direction. The line-type printer is a printer that has a plurality of nozzles arranged at a predetermined regular pitch in the width direction X and is capable of ejecting a liquid throughout the width of a medium.

The medium is not limited to paper. The medium may be a film made of resin or a sheet made of resin, a composite film made of resin and metal, a laminate film, woven fabric, nonwoven fabric, a metal foil, a metal film, a ceramic sheet, a cloth, or the like. The medium may be unreeled from a roll.

Any kind of liquid may be chosen as long as it is possible to perform recording on a medium by the liquid being stuck on the medium. For example, "ink" encompasses a substance that is made as a result of dissolution, dispersion, or mixture of particles of a functional material made of a solid such as pigment, metal particles, or the like into/with a solvent, and encompasses various kinds of liquid composition such as water-based ink, oil-based ink, gel ink, hot melt ink, and the like.

The recording apparatus 11 is not limited to an ink-jet printer. The recording apparatus 11 may be a dot-impact printer.

The recording scheme of the recording apparatus 11 may be a laser scheme instead of an ink-jet scheme.

The phrase "at least any one of" as used in this specification means one or more of given choices. For example, if the number of choices is two, the phrase "at least any one of" as used in this specification means either one only, or both, of these two choices. For example, if the number of choices is three or more, the phrase "at least any one of" as used in this specification means any one only, or a combination of any two or more, of these three or more choices.

Additional Remarks

Technical concepts that will be understood from the foregoing embodiments and modification examples, and the operational effects thereof, are described below.

(A) A recording apparatus includes: a recording unit that performs recording on a medium; a body configured to be changed in position in a position-change direction intersecting with a vertical direction, the recording unit being mounted in the body; a switching portion configured to switch whether to restrict a change in position of the body in the position-change direction or not; and a housing configured to house the body, wherein the switching portion is configured to change in position between a first switching position and a second switching position at which the switching portion protrudes more from a bottom surface of the housing than at the first switching position, the first switching position is a position at which the switching portion is located in a state of being in contact with an installation surface when the housing is installed on the installation surface, the second switching position is a position at which the switching portion is located when the housing is not installed on the installation surface, and the switching portion does not restrict the change in position of the body in the position-change direction when located at the first switching position and restricts the change in position of the body in the position-change direction when located at the second switching position.

According to this structure, the switching portion is located at the second switching position when the housing is not installed on the installation surface, for example, when the housing is lifted up from the installation surface. In this case, a change in position of the body in the position-change direction is restricted. Therefore, even when the housing is tilted due to the lifting up of the housing from the installation surface, it is possible to prevent the user from changing the position of the body with respect to the housing unintentionally.

The switching portion is located at the first switching position in a state of being in contact with the installation surface when the housing is installed on the installation surface. In this case, a change in position of the body in the position-change direction is not restricted. For this reason, as long as the housing is installed on the installation surface, the position of the body can be changed in the position-change direction and, therefore, it is possible to enhance operability regarding a change in position of the body.

(B) The recording apparatus may further include: a holding portion configured to hold the body at a predetermined position with respect to the housing, wherein the holding portion may be configured to change in position between a first position and a second position along a horizontal plane intersecting with the vertical direction, the holding portion may be configured not to hold the body at the predetermined position when located at the first position and may be configured to hold the body at the predetermined position when located at the second position, and the switching portion may be configured not to restrict a change in position of the holding portion from the second position to the first position when located at the first switching position and may be configured to restrict the change in position of the holding portion from the second position to the first position when located at the second switching position.

This structure produces the same effects as those produced by (A).

(C) The recording apparatus may further include: a first urging portion, wherein the holding portion may be configured to rotate along the horizontal plane by being urged by the first urging portion.

This structure produces the same effects as those produced by (A).

(D) The recording apparatus may further include: a second urging portion, wherein the switching portion may be configured to rotate along a vertical plane by being urged by the second urging portion.

With this structure, using both the holding portion configured to rotate along a horizontal plane and the switching portion configured to rotate along a vertical plane makes it possible to achieve a reduction in space and prevent the user from changing the position of the body with respect to the housing unintentionally.

(E) The recording apparatus may include: a plurality of switching portions each of which is the switching portion.

With this structure, even when one of the plurality of switching portions fails to change in position to the second switching position due to contact with the user, the other switching portion(s) changes in position to the second switching position. By this means, it is possible to restrict a change in position of the body in the position-change direction. Therefore, even when the housing is tilted due to the lifting up of the housing from the installation surface, it is possible to prevent the user from changing the position of the body with respect to the housing unintentionally.

(F) The recording apparatus may include: a plurality of switching portions each of which is the switching portion; and a plurality of holding portions each of which is the holding portion.

This structure produces the same effects as those produced by (E).

(G) The body may include a sliding portion configured to slide on the housing, the sliding portion may have a to-be-engaged portion configured to be engaged with the holding portion, and the holding portion may restrict the change in position of the body in the position-change direction when located at the second position in a state of being engaged with the to-be-engaged portion.

With this structure, it is possible to change the position of the body in the position-change direction smoothly. Therefore, it is possible to enhance operability. Moreover, it is possible to hold the body at a predetermined position with a simple structure by providing the to-be-engaged portion in the body.

(H) The body may be configured to be changed in position in the position-change direction between a closed position and an open position, the closed position may be a position at which the body is housed inside the housing, the open position may be a position at which the body protrudes from the housing in a first position-change direction of the position-change direction, the body may include a sliding portion configured to slide on the housing, the sliding portion may have a first to-be-engaged portion and a second to-be-engaged portion, the first to-be-engaged portion and the second to-be-engaged portion may be configured to be engaged with the holding portion, the holding portion, when located at the second position in a state of being engaged with the first to-be-engaged portion, may restrict the change in position of the body in the position-change direction in a state in which the body is located at the closed position, and the holding portion, when located at the second position in a state of being engaged with the second to-be-engaged portion, may restrict the change in position of the body in the position-change direction in a state in which the body is located at the open position.

With this structure, it is possible to change the position of the body in the position-change direction smoothly. Therefore, it is possible to enhance operability. Moreover, it is possible to hold the body at a predetermined position with a simple structure by providing the to-be-engaged portion in the body. Furthermore, it is possible to restrict a change in position of the body in the position-change direction both when the body is located at the closed position and when the body is located at the open position. Therefore, even when the housing is tilted due to the lifting up of the housing from the installation surface, it is possible to prevent the user from changing the position of the body with respect to the housing unintentionally.

What is claimed is:

1. A recording apparatus, comprising:

a recording unit that performs recording on a medium;

a body configured to be changed in position in a position-change direction intersecting with a vertical direction, the recording unit being mounted in the body;

a switching portion configured to switch whether to restrict a change in position of the body in the position-change direction or not; and a housing configured to house the body, wherein the switching portion is configured to change in position between a first switching position and a second switching position at which the switching portion protrudes more from a bottom surface of the housing than at the first switching position, the first switching position is a position at which the switching portion is located in a state of being in contact with an installation surface when the housing is installed on the installation surface, the second switching position is a position at which the switching portion is located when the housing is not installed on the installation surface, and the switching portion does not restrict the change in position of the body in the position-change direction when located at the first switching position and restricts the change in position of the body in the position-change direction when located at the second switching position.

2. The recording apparatus according to claim 1, further comprising:

a holding portion configured to hold the body at a predetermined position with respect to the housing, wherein the holding portion is configured to change in position between a first position and a second position along a horizontal plane intersecting with the vertical direction, the holding portion does not hold the body at the predetermined position when located at the first position and holds the body at the predetermined position when located at the second position, and the switching portion does not restrict a change in position of the holding portion from the second position to the first position when located at the first switching position and restricts the change in position of the holding portion from the second position to the first position when located at the second switching position.

3. The recording apparatus according to claim 2, further comprising:

a first urging portion, wherein the holding portion is configured to rotate along the horizontal plane by being urged by the first urging portion.

4. The recording apparatus according to claim 3, further comprising:

a second urging portion, wherein the switching portion is configured to rotate along a vertical plane by being urged by the second urging portion.

5. The recording apparatus according to claim 2, comprising:

a plurality of switching portions each of which is the switching portion; and a plurality of holding portions each of which is the holding portion.

6. The recording apparatus according to claim 2, wherein the body includes a sliding portion configured to slide on the housing, the sliding portion has a to-be-engaged portion configured to be engaged with the holding portion, and the holding portion restricts the change in position of the body in the position-change direction when located at the second position in a state of being engaged with the to-be-engaged portion.

7. The recording apparatus according to claim 2, wherein the body is configured to be changed in position in the position-change direction between a closed position and an open position, the closed position is a position at which the body is housed inside the housing, the open position is a position at which the body protrudes from the housing in a first position-change direction of the position-change direction, the body includes a sliding portion configured to slide on the housing, the sliding portion has a first to-be-engaged portion and a second to-be-engaged portion, the first to-be-engaged portion and the second to-be-engaged portion are configured to be engaged with the holding portion, the holding portion, when located at the second position in a state of being engaged with the first to-be-engaged portion, restricts the change in position of the body in the position-change direction in a state in which the body is located at the closed position, and the holding portion, when located at the second position in a state of being engaged with the second to-be-engaged portion, restricts the change in position of the body in the position-change direction in a state in which the body is located at the open position.

8. The recording apparatus according to claim 1, comprising:

a plurality of switching portions each of which is the switching portion.

* * * * *